(12) United States Patent
Kamon

(10) Patent No.: US 10,851,255 B2
(45) Date of Patent: Dec. 1, 2020

(54) DEVICE FOR DISCHARGING LIQUID, METHOD FOR DISCHARGING LIQUID, CURABLE COMPOSITION, CURABLE INK, CURED PRODUCT, AND STORING CONTAINER

(71) Applicant: Yuuki Kamon, Kanagawa (JP)

(72) Inventor: Yuuki Kamon, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 16/354,801

(22) Filed: Mar. 15, 2019

(65) Prior Publication Data

US 2019/0284418 A1    Sep. 19, 2019

(30) Foreign Application Priority Data

Mar. 16, 2018    (JP) ................. 2018-048880

(51) Int. Cl.
| | | |
|---|---|---|
| *C09D 11/38* | (2014.01) | |
| *B41J 2/14* | (2006.01) | |
| *B41J 2/175* | (2006.01) | |
| *C09D 11/40* | (2014.01) | |

(52) U.S. Cl.
CPC ............. *C09D 11/38* (2013.01); *B41J 2/1433* (2013.01); *B41J 2/14233* (2013.01); *B41J 2/14274* (2013.01); *B41J 2/17533* (2013.01); *B41J 2002/14403* (2013.01); *B41J 2202/12* (2013.01); *C09D 11/40* (2013.01)

(58) Field of Classification Search
CPC . B41J 11/002; B41J 2/01; B41J 2/2114; B41J 2002/14403; B41J 2202/12; B41J 2/14233; B41J 2/14274; B41J 2/1433; B41J 2/17533; B41J 2/5052; B41J 2/2107; B41J 2/18; C09D 11/101; C09D 11/30; C09D 11/322; C09D 11/38; C09D 11/40; C09D 11/02
See application file for complete search history.

(56) References Cited

U.S. PATENT DOCUMENTS

| | | | |
|---|---|---|---|
| 2016/0185113 A1 | 6/2016 | Yoshida et al. | |
| 2016/0347961 A1* | 12/2016 | Kobayashi | ............. C09D 11/38 |
| 2017/0297334 A1* | 10/2017 | De Meutter | ............... B41J 2/18 |

FOREIGN PATENT DOCUMENTS

| | | |
|---|---|---|
| JP | 2004-083865 | 3/2004 |
| JP | 2010-106254 | 5/2010 |
| JP | 2016-124191 | 7/2016 |
| JP | 2017-131865 | 8/2017 |

* cited by examiner

*Primary Examiner* — Jannelle M Lebron
(74) *Attorney, Agent, or Firm* — Oblon, McClelland, Maier & Neustadt, L.L.P.

(57) ABSTRACT

A device for discharging liquid is provided. The device includes a liquid discharge head including a curable composition, individual liquid chambers, and a nozzle. The curable composition comprises polymerizable compounds including a bifunctional or higher multifunctional compound accounting for 25% by mass to 45% by mass of an entire amount of the polymerizable compounds and a particle having an average primary particle diameter of 20 nm to 100 nm. The individual liquid chambers have circulation channels in which the curable composition circulates. The nozzle is communicated with the individual liquid chambers, and configured to discharges droplets.

17 Claims, 13 Drawing Sheets

DEVICE FOR DISCHARGING LIQUID, METHOD FOR DISCHARGING LIQUID, CURABLE COMPOSITION, CURABLE INK, CURED PRODUCT, AND STORING CONTAINER

CROSS-REFERENCE TO RELATED APPLICATIONS

This patent application is based on and claims priority pursuant to 35 U.S.C. § 119(a) to Japanese Patent Application No. 2018-048880, filed on Mar. 16, 2018, in the Japan Patent Office, the entire disclosure of which is hereby incorporated by reference herein.

BACKGROUND

Technical Field

Embodiments of this disclosure relate to a device for discharging liquid, a method for discharging liquid, a curable composition, a curable ink, a cured product, and a storing container.

Description of the Related Art

An active energy ray-curable ink may be used as an ink which can be used in an inkjet recording system. This active energy ray-curable ink has been supplied to, and used in offset printing, silk screen printing, and as top coat agents, and recently, the quantity used has been increasing due to the advantages such as a decrease in cost due to the simplification of the drying process and the reduction of the amount of volatile solvent in response to environmental concerns.

Recently, applications using an active energy ray-curable ink to apply a decorative printing to a substrate to be processed have been increasing as industrial applications. Maintaining substrate adhesion and a high hardness, while ensuring decorativeness has been sought, but achieving all of these properties has been difficult.

In attempting to achieve both substrate adhesion and high hardness, one method has been proposed which reduces the curing contraction during polymerization by use of a cationic polymerizable material, and ensures the establishment of both substrate adhesion and hardness.

Further, in attempting to ensure the establishment of both stretchability and hardness, one method of increasing the particle density at the surface layer has been proposed, by permeating a monomer component of a second layer into a lower layer with respect to an ink layer of a first layer.

SUMMARY

In accordance with some embodiments of the present invention, a device for discharging liquid is provided. The device includes a liquid discharge head including a curable composition, individual liquid chambers, and a nozzle. The curable composition comprises polymerizable compounds including a bifunctional or higher multifunctional compound accounting for 25% by mass to 45% by mass of an entire amount of the polymerizable compounds and a particle having an average primary particle diameter of 20 nm to 100 nm. The individual liquid chambers have circulation channels in which the curable composition circulates. The nozzle is communicated with the individual liquid chambers, and configured to discharges droplets.

BRIEF DESCRIPTION OF THE DRAWINGS

The aforementioned and other aspects, features, and advantages of the present disclosure would be better understood by reference to the following detailed description when considered in connection with the accompanying drawings, wherein.

Figure 1:
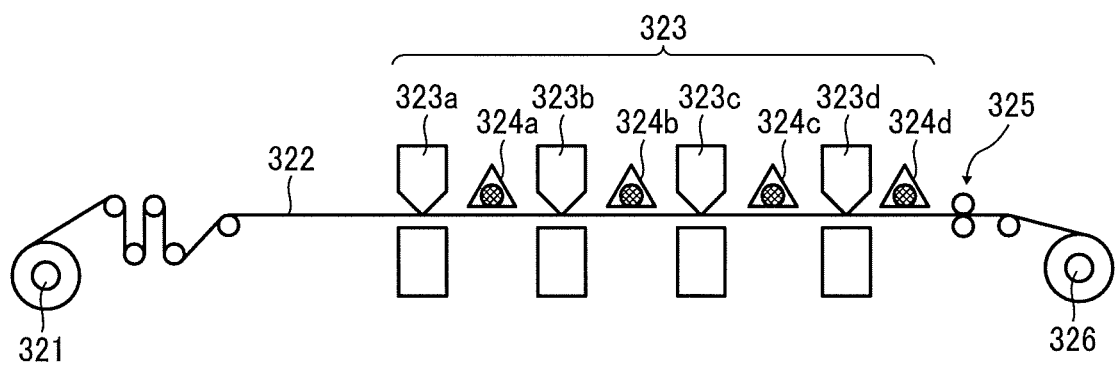
FIG. 1 is a schematic view illustrating an image forming device of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION OF EMBODIMENTS

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Referring now to the drawings, embodiments of the present disclosure are described below. In the drawings for explaining the following embodiments, the same reference codes are allocated to elements (members or components) having the same function or shape and redundant descriptions thereof are omitted below.

The present disclosure provides a device for discharging liquid capable of stably discharging a curable composition, the cured product thereof having excellent substrate adhesion and a high hardness.
(Device for Discharging Liquid and Method for Discharging Liquid)

The device for discharging liquid of the present disclosure is provided with a liquid discharge head including a curable composition, individual liquid chambers, and a nozzle. The curable composition comprises polymerizable compounds including a bifunctional or higher multifunctional compound accounting for 25% by mass to 45% by mass of the entire amount of the polymerizable compounds, and a particle having an average primary particle diameter of 20 nm to 100 nm. The individual liquid chambers have circulation channels in which the curable composition circulates. The nozzle communicates with the individual liquid chambers and configured to discharge droplets. The device is provided with other members in accordance with need.

The method for discharging liquid of the present disclosure comprises a discharge process for discharging a curable composition from a nozzle of a liquid discharge head while circulating the curable composition in individual liquid chambers, where the curable composition comprises polymerizable compounds including a bifunctional or higher multifunctional compound accounting for 25% by mass to 45% by mass of the entire amount of the polymerizable compounds, and a particle having an average primary particle diameter of 20 nm to 100 nm. The method includes other processes in accordance with need.

The device for discharging liquid and the method for discharging liquid of the present disclosure are based on the knowledge that as there is a limit to the viscosity of the ink that can be discharged, an conventional technique to increase the density of the particle is difficult.

Further, the device for discharging liquid and the method for discharging liquid of the present disclosure are based on the following knowledge. That is, although a conventional ink containing 10% by mass to 30% by mass of an inorganic particle having an average primary particle size of less than 70 nm has been proposed, it is not possible for this ink to contain an inorganic particle having a larger particle size at a high concentration, thus, as limitations are added to the decorativeness of the ink, it is particularly difficult to bring out a matt tone texture. Further, when such an inorganic particle having a large particle size is included, there are the problems that the sedimentation of the inorganic particle inside the ink occurs over time, the viscosity of the ink increases quickly, and the discharge tends to be insufficient. As a result, even if discharge is possible, the concentration of the inorganic particles is not uniform within the ink, thus, the glossiness of the cured product is uneven.

Furthermore, the device for discharging liquid and the method for discharging liquid of the present disclosure are based on the knowledge that, although the texture of the ink cured product can be changed by varying the particle size of the inorganic particle to be added, if the particle size of the inorganic particle to be added is too large, the feeling of opacity is brought out strongly, and if the particle size of the inorganic particle to be added is too small, the matt tone texture cannot be brought out.

The inventors of the present disclosure, as the result of performing keen examinations taking the above-mentioned problems into account, discovered that both substrate adhesion and coating film hardness can be established by adjusting the average primary particle size and the content of the particle to be added within a constant range. Further, it was discovered that by circulating the liquid inside the liquid discharge head, the sedimentation of the particles inside the liquid is prevented, and the viscosity increase due to drying can be prevented, thus, it is possible to solve the problem regarding the liquid discharge and the uneven gloss of the cured product.

Therefore, by providing a liquid discharge head including the curable composition comprising polymerizable compounds including a bifunctional or higher multifunctional compound accounting for 25% by mass to 45% by mass of the entire amount of the polymerizable compounds and a particle having an average primary particle diameter of 20 nm to 100 nm, individual liquid chambers having circulation channels in which the curable composition circulates, and a nozzle communicated with the individual liquid chambers configured to discharge droplets, the device for discharging liquid of the present disclosure is capable of stably discharging a curable composition which provides a cured product having excellent substrate adhesion and a high hardness.
(Curable Composition)

The curable composition of the present disclosure comprises polymerizable compounds including a bifunctional or higher multifunctional compound accounting for 25% by mass to 45% by mass of the entire amount of the polymerizable compounds, and a particle having an average primary particle diameter of 20 nm to 100 nm, and further comprises other components in accordance with need.
<Polymerizable Compound>

The polymerizable compound is a compound which causes polymerization and undergoes curing by heat or active energy rays (ultraviolet rays, electron beams, and the like).

The polymerizable compounds include a multifunctional compound having a bifunctional or higher functional group in the range of 25% by mass to 45% by mass relative to the entire amount of the polymerizable compounds, and furthermore, may include a monofunctional monomer, a monofunctional oligomer, and other monomers. Examples of the multifunctional compound include multifunctional monomers and multifunctional oligomers.

The content of the multifunctional compound is 25% by mass to 45% by mass, and preferably 30% by mass to 40% by mass, relative to the entire amount of the polymerizable compounds. When only a monofunctional monomer is included, the decrease in the hardness of the cured product is remarkable, thus, by including the multifunctional compound having a bifunctional or higher functional group, the hardness can be maintained. In order to ensure the coating film hardness, it is necessary to include 25% by mass or more of the multifunctional compound relative to the entire amount of the polymerizable compounds. Further, it is necessary to include 45% by mass or less of the multifunctional compound relative to the entire amount of the polymerizable compounds in view of the reduction of the substrate adhesion due to curing contraction during polymerization.

<Monofunctional Monomer>

The monofunctional monomer is not particularly limited. It can suitably be selected to a particular application.

Specific examples of the monofunctional monomer include, but are not limited to, hydroxyethyl (meth)acrylamide, (meth)acryloylmorpholine, dimethylaminopropyl acrylamide, isobornyl (meth)acrylate, adamantyl (meth) acrylate, 2-methyl-2-adamantyl (meth)acrylate, dicyclopentenyl (meth)acrylate, dicyclopentanyl (meth)acrylate, dicyclopentenyloxyethyl (meth)acrylate, 3,3,5-trimethylcyclohexane (meth)acrylate, t-butyl methacrylate, tetrahydrofurfuryl (meth)acrylate, cyclohexyl (meth)acrylate, benzyl (meth)acrylate, 2-hydroxyethyl (meth)acrylate, 2-hydroxypropyl (meth)acrylate, 2-hydroxybutyl acrylate, isobutyl acrylate, t-butyl acrylate, phenoxyethyl acrylate, (2-methyl-2-ethyl-1,3-dioxolane-4-yl)-methyl acrylate, and cyclic trimethylolpropane formal acrylate. These may be used singly or in combinations of two or more. Among monofunctional monomers, the monomers in which the glass-transition temperature of the cured product is high are preferable. When a monomer having a high glass-transition temperature is blended in the curable composition, the hardness at a low temperature increases, and stretchability can be obtained at high temperatures, thus, the compatibility between the stretchability and the hardness becomes high. It is preferable to include a monomer the homopolymer of which having a glass-transition temperature of 50° C. or more, and it is more preferable to include a monomer the homopolymer of which having a glass-transition temperature of 80° C. or more.

<Multifunctional Compound>

The multifunctional compound is not particularly limited as along as it is a polymerizable compound having two or more functional groups. It can suitably be selected to a particular application. Examples thereof include, but are not limited to, multifunctional monomers and multifunctional oligomers. The number of functional groups is preferably 2 to 6, and a bifunctional compound is preferable from the point that it is less likely to inhibit the stretchability.

Specific examples of the multifunctional monomer include, but are not limited to, neopentyl glycol di (meth) acrylate, (poly)ethylene glycol di(meth)acrylate, diethylene glycol di(meth)acrylate, triethylene glycol di(meth)acrylate, tetraethylene glycol di(meth)acrylate, polypropylene glycol di(meth)acrylate, (poly) tetramethylene glycol di(meth) acrylate, di(meth)acrylate of bisphenol A propylene oxide adduct (PO), ethoxylated neopentyl glycol di(meth)acrylate, propoxylated neopentyl glycol di(meth)acrylate, di(meth) acrylate of bisphenol A ethylene oxide adduct (EO), EO-modified pentaerythritol tri(meth)acrylate, PO-modified pentaerythritol tri(meth)acrylate, EO-modified pentaerythritol tetra(meth)acrylate, PO-modified pentaerythritol tetra (meth)acrylate, EO-modified dipentaerythritol tetra(meth) acrylate, PO-modified dipentaerythritol tetra(meth)acrylate, EO-modified trimethylolpropane tri(meth)acrylate, PO-modified trimethylolpropane tri(meth)acrylate, EO-modified tetramethylolmethane tetra(meth)acrylate, PO-modified tetramethylolmethane tetra(meth)acrylate, pentaerythritol tri(meth)acrylate, pentaerythritol tetra(meth) acrylate, dipentaerythritol tetra(meth)acrylate, trimethylolpropane tri(meth)acrylate, tetramethylolmethane tetra(meth) acrylate, trimethylolethane tri(meth)acrylate, trimethylolpropane tri(meth)acrylate, bis-(4-(meth)acryloxypolyethoxyphenyl)propane, diallyl phthalate, triallyl trimellitate, 1,6-hexanediol di(meth)acrylate, 1,9-nonanediol di(meth)acrylate, 1,3-butylene glycol di(meth)acrylate, 1,10-decanediol di(meth)acrylate, neopentyl glycol hydroxypivalate di(meth)acrylate, tetramethylolmethane tri (meth)acrylate, dimethylol tricyclodecane di(meth)acrylate, modified glycerin tri (meth)acrylate, bisphenol A diglycidyl ether (meth) acrylic acid adduct, modified bisphenol A di(meth)acrylate, caprolactone-modified dipentaerythritol hexa(meth)acrylate, and dipentaerythritol hexa(meth)acrylate and the like. These may be used singly or in combinations of two or more.

Specific examples of the multifunctional oligomer include, but are not limited to, pentaerythritol tri(meth) acrylate tolylene diisocyanate urethane prepolymer, pentaerythritol tri(meth)acrylate hexamethylene diisocyanate urethane prepolymer, ditrimethylolpropane tetra(meth)acrylate, pentaerythritol tri(meth)acrylate hexamethylene diisocyanate urethane prepolymer, urethane (meth)acrylate oligomer, epoxy acrylate oligomer, polyester (meth)acrylate oligomer, polyether (meth)acrylate oligomer, and silicon (meth)acrylate oligomer. These may be used singly or in combinations of two or more.

A urethane acrylate oligomer is preferable as the multifunctional oligomer. A commercially available product can be used as the urethane acrylate oligomer. Specific examples of the commercially available product include, but are not limited to; UV-2000B, UV-2750B, UV-3000B, UV-3010B, UV-3200B, UV-3300B, UV-3700B, UV-6640B, UV-8630B, UV-7000B, UV-7610B, UV-1700B, UV-7630B, UV-6300B, UV-6640B, UV-7550B, UV-7600B, UV-7605B, UV-7610B, UV-7630B, UV-7640B, UV-7650B, UT-5449, and UT-5454 manufactured by The Nippon Synthetic Chemical Industry Co., Ltd; CN929, CN961E75, CN961H81, CN962, CN963, CN963A80, CN963B80, CN963E75, CN963E80, CN963J85, CN965, CN965A80, CN966A80, CN966H90, CN966J75, CN968, CN981, CN981A75, CN981B88, CN982, CN982A75, CN982B88, CN982E75, CN983, CN985B88, CN9001, CN9002, CN9788, CN970A60, CN970E60, CN971, CN971A80, CN972, CN973A80, CN973H85, CN973J75, CN975, CN977C70, CN978, CN9782, CN9783, CN996, and CN9893 manufactured by Tomoe Engineering Co., Ltd.; and EBECRYL210, EBECRYL220, EBECRYL230, EBECRYL270, KRM8200, EBECRYL5129, EBECRYL8210, EBECRYL8301, EBECRYL8804, EBECRYL8807, EBECRYL9260, KRM7735, KRM8296, KRM8452, EBECRYL4858, EBECRYL8402, EBECRYL9270, EBECRYL8311, and EBECRYL8701 manufactured by Daicel-Cytec Co., Ltd.

The higher the content of the multifunctional compound, the more the hardness improves, but the stretchability tends to decrease.

The larger the ratio of the molecular weight to the number of functional groups, the more the above-mentioned effect is brought about at a smaller content, and the smaller the value, the smaller the effect. Further, the greater the weight average molecular weight, the more the viscosity of the curable composition tends to increase. The weight average molecular weight is preferably 15,000 or less.

Here, the weight average molecular weight is obtained in terms of a standard polystyrene, and indicates a value which was measured by three-tandem columns Shodex GPC KF-806L (exclusion limit molecular weight: $2\times10^7$, separation range: 100 to $2\times10^7$, number of theoretical plates: 10,000 per column, filler material: styrene-divinylbenzene copolymer, and filler particle diameter: 10 µm) in a high-performance liquid chromatography ("WATERS 2695 (main device)" and "WATERS 2414 (detector)" manufactured by Nihon Waters K.K.).

<Other Monomers>

Other monomers may be included as the polymerizable compounds. Examples of the other monomers include, but are not limited to, a monofunctional monomer the homopolymer of which having a glass-transition temperature of less than 50° C.

This kind of monofunctional monomer is not particularly limited. It can suitably be selected to a particular application. Examples thereof include, but are not limited to, tetrahydrofurfuryl (meth)acrylate, cyclohexyl (meth)acrylate, benzyl (meth)acrylate, 2-hydroxyethyl (meth)acrylate, 2-hydroxypropyl (meth)acrylate, 2-hydroxybutyl (meth)acrylate, isobutyl (meth)acrylate, t-butyl (meth)acrylate, phenoxyethyl (meth)acrylate, (2-methyl-2-ethyl-1,3-dioxolane-4-yl)-methyl (meth)acrylate, and cyclic trimethylolpropane formal (meth)acrylate. These may be used singly or in combinations of two or more.

<Particle>

The particle having an average primary particle diameter of 20 nm to 100 nm is included in the curable compound. By including the particle having an average primary particle diameter within this range, the curing contraction can be alleviated during polymerization.

Here, the average primary particle diameter of the particle can be measured by, for example, using a scanning electron microscope.

The particle is preferably a silica particle for its good sedimentation property. Note that, the particle other than the silica particle can also be used as long as the specific gravity is comparable to the specific gravity of the silica particle.

The type of silica particle is not particularly limited. It can suitably be selected to a particular application. From the viewpoint of the viscosity, a silica dispersion liquid is preferable that is synthesized by a wet method, subjected to an organic surface treatment, and solvent-substituted with an organic dispersion medium. Further, from the viewpoint of the cost, a silica dispersion liquid obtained by mill-dispersing silica particles while adding a surface treatment agent and/or a dispersant thereto is also preferable. Conventionally, discharging a high-concentration particle dispersion by an inkjet has been difficult due to the sedimentation of particles in the ink flow path and extreme thickening and curing due to drying. However, in the present disclosure, a stable discharge is possible by circulating the ink within the head as stated above.

In the discharged droplet, the ratio of the particle having an average primary particle diameter of 20 nm to 100 nm to the components other than the particle is preferably 10% by mass to 15% by mass. The particle having an average primary particle diameter of 20 nm to 100 nm can suppress the curing contraction if at least one particle is contained in the droplet. The liquid discharge head of the present disclosure is used in order to make the proportion (by volume) of the particles within the droplet (one nozzle discharge portion) of the curable composition to be discharged, that is, the proportion of the particles per unit area in the printed matter constant.

The content of the particle is preferably 5% by mass to 30% by mass relative to the entirety of the curable composition, and more preferably 10% by mass to 20% by mass.

There are the advantages that the content of the particle in the range of 5% by mass to 30% by mass can reduce the curing contraction, and uniform dispersion of the particle can be maintained within the liquid.

<Curing Means>

Preferably, the curable composition according to an embodiment of the present invention is cured by application of heat or irradiation with an active energy ray, and the latter is more preferred.

Specific examples of the active energy ray for curing the curable composition include, but are not limited to, electron beams, α-rays, β-rays, γ-rays, and X-rays, in addition to ultraviolet rays. When a light source having a particularly high energy is used, polymerization reaction can be allowed to proceed without a polymerization initiator. In addition, in the case of irradiation with ultraviolet ray, mercury-free is preferred in terms of protection of environment. Therefore, replacement with GaN-based semiconductor ultraviolet light-emitting devices is preferred from industrial and environmental point of view. Furthermore, ultraviolet light-emitting diode (UV-LED) and ultraviolet laser diode (UV-LD) are preferable as an ultraviolet light source. Small sizes, long time working life, high efficiency, and high cost performance make such irradiation sources desirable.

<Polymerization Initiator>

The curable composition of the present disclosure optionally contains a polymerization initiator. The polymerization initiator produces active species such as a radical or a cation upon application of energy of an active energy ray and initiates polymerization of a polymerizable compound (monomer or oligomer).

As the polymerization initiator, it is suitable to use a known radical polymerization initiator, cation polymerization initiator, base producing agent, or a combination thereof. Of these, a radical polymerization initiator is preferable. Moreover, the polymerization initiator preferably accounts for 5% by mass to 20% by mass of the total content of the composition (100% by mass) to obtain sufficient curing speed.

Specific examples of the radical polymerization initiators include, but are not limited to, aromatic ketones, acylphosphine oxide compounds, aromatic onium chlorides, organic peroxides, thio compounds (thioxanthone compounds, thiophenyl group containing compounds, etc.), hexaaryl biimidazole compounds, ketoxime ester compounds, borate compounds, azinium compounds, metallocene compounds, active ester compounds, compounds having a carbon halogen bond(s), and alkyl amine compounds.

In addition, a polymerization accelerator (sensitizer) is optionally used together with the polymerization initiator. The polymerization accelerator is not particularly limited. Preferred examples thereof include, but are not limited to, amines such as trimethylamine, methyl dimethanol amine, triethanol amine, p-diethylamino acetophenone, ethyl p-dimethylaminobenzoate, 2-ethylhexyl p-dimethyl aminobenzoate-, N,N-dimethylbenzylamine, and 4,4'-bis(diethylamino)benzophenone. The content thereof is determined depending on the identity (type) of the polymerization initiator and the content thereof.

<Colorants>

The curable composition of the present disclosure may contain a colorant. As the colorant, various pigments and dyes may be used that impart black, white, magenta, cyan, yellow, green, orange, and gloss colors such as gold and silver, depending on the intended purpose of the composition and requisite properties thereof.

A content of the colorant in the curable composition is not particularly limited, and may be appropriately determined considering, for example, a desired color density and dispersibility of the colorant in the composition. However, it is preferably from 0.1% by mass to 20% by mass relative to the total mass (100% by mass) of the composition.

Incidentally, the curable composition of the present disclosure does not necessarily contain a colorant but can be clear and colorless. In such a case, for example, such a clear and colorless composition is good for an overcoating layer to protect an image.

The pigment can be either inorganic or organic, and two or more of the pigments can be used in combination.

Specific examples of the inorganic pigments include, but are not limited to, carbon blacks (C.I. Pigment Black 7) such as furnace black, lamp black, acetylene black, and channel black, iron oxides, and titanium oxides.

Specific examples of the organic pigments include, but are not limited to, azo pigments such as insoluble azo pigments, condensed azo pigments, azo lakes, and chelate azo pigments, polycyclic pigments such as phthalocyanine pigments, perylene pigments, perinone pigments, anthraquinone pigments, quinacridone pigments, dioxane pigments, thioindigo pigments, isoindolinone pigments, and quinophthalone pigments, dye chelates (e.g., basic dye chelates, acid dye chelates), dye lakes (e.g., basic dye lakes, acid dye lakes), nitro pigments, nitroso pigments, aniline black, and daylight fluorescent pigments.

In addition, a dispersant is optionally added to enhance the dispersibility of pigment. The dispersant has no particular limit and can be, for example, polymer dispersants conventionally used to prepare pigment dispersion (material).

The dyes include, for example, acidic dyes, direct dyes, reactive dyes, basic dyes, and combinations thereof.

<Organic Solvent>

The curable composition of the present disclosure optionally contains an organic solvent although it is preferable to spare it. The curable composition free of an organic solvent, in particular volatile organic compound (VOC), is preferable because it enhances safety at where the composition is handled and makes it possible to prevent pollution of the environment. Incidentally, the organic solvent represents a conventional non-reactive organic solvent, for example, ether, ketone, xylene, ethyl acetate, cyclohexanone, and toluene, which is clearly distinguished from reactive monomers. Furthermore, "free of" an organic solvent means that no organic solvent is substantially contained. The content thereof is preferably less than 0.1% by mass.

<Other Components>

The curable composition of the present disclosure optionally contains other known components. The other known components are not particularly limited. Specific examples thereof include, but are not limited to, known articles such as surfactants, polymerization inhibitors, leveling agents, defoaming agents, fluorescent brighteners, permeation enhancing agents, wetting agents (humectants), fixing agents, viscosity stabilizers, fungicides, preservatives, anti-oxidants, ultraviolet absorbents, chelate agents, pH adjusters, (regulators), and thickeners.

<Preparation of Curable Composition>

The curable composition of the present disclosure, as stated above, comprises a particle and polymerizable compounds. The particle has an average primary particle diameter of 20 nm to 100 nm. The polymerizable compounds comprises 25% by mass to 45% by mass of a multifunctional compound having a bifunctional or higher functional group relative to the entire amount of the polymerizable compounds.

The curable composition of the present disclosure can be prepared by using the components described above. The preparation devices and conditions are not particularly limited. For example, the curable composition can be prepared by subjecting the particle, the polymerizable compounds, a pigment, a dispersant, etc., to a dispersion treatment using a dispersing machine such as a ball mill, a kitty mill, a disk mill, a pin mill, and a DYNO-MILL to prepare a particle-pigment liquid dispersion, and further mixing the particle-pigment liquid dispersion with a polymerizable monomer, an initiator, a polymerization initiator, and a surfactant.

<Viscosity>

The viscosity of the curable composition of the present disclosure has no particular limit because it can be adjusted depending on the purpose and application devices. For example, if a discharge device that discharges the composition from nozzles is employed, the viscosity thereof is preferably in the range of 3 mPa·s to 40 mPa·s, more preferably 5 mPa·s to 30 mPa·s, and particularly preferably 6 mPa·s to 15 mPa·s in the temperature range of 20° C. to 65° C., preferably at 25° C. In addition, it is particularly preferable to satisfy this viscosity range by the composition free of the organic solvent described above. Incidentally, the viscosity can be measured by a cone plate rotary viscometer (VISCOMETER TVE-22L, manufactured by TOKI SANGYO CO., LTD.) using a cone rotor (1°34'×R24) at a number of rotation of 50 rpm with a setting of the temperature of hemathermal circulating water in the range of 20° C. to 65° C.

<Application>

The application field of the curable composition of the present disclosure is not particularly limited. It can be applied to any field where curable compositions are used. For example, the curable composition is selected to a particular application and used for a resin for processing, a paint, an adhesive, an insulant, a release agent, a coating material, a sealing material, various resists, and various optical materials.

Figure 2:
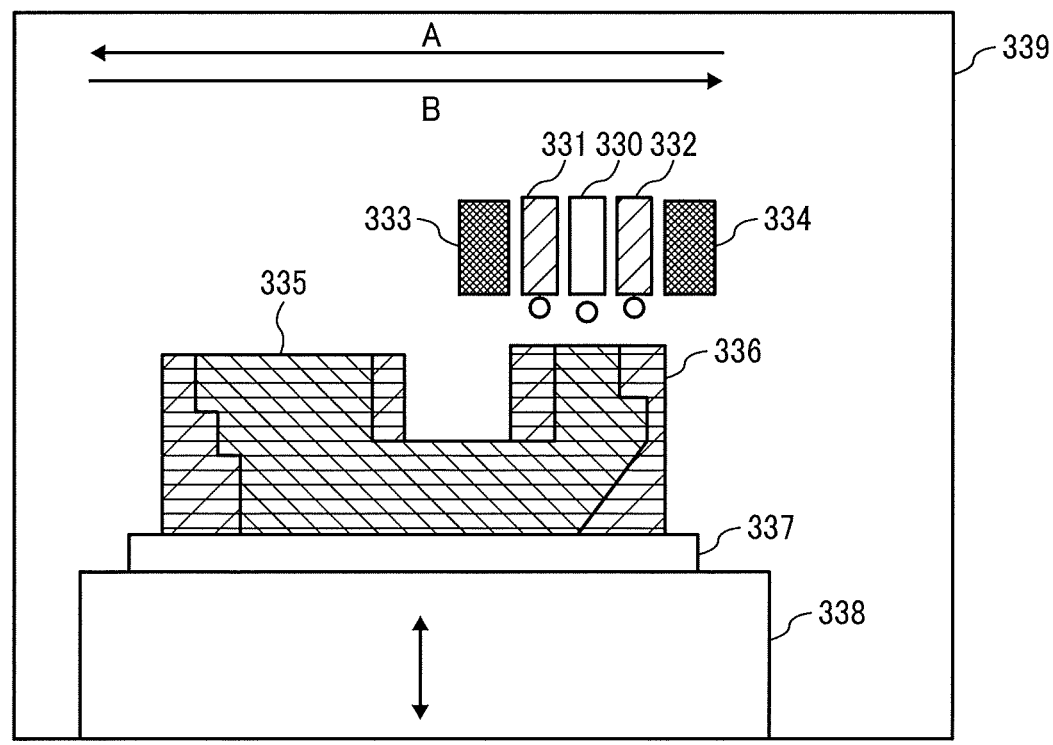
FIG. 2 is a schematic view illustrating an image forming device of the present disclosure.
Figure 3A:
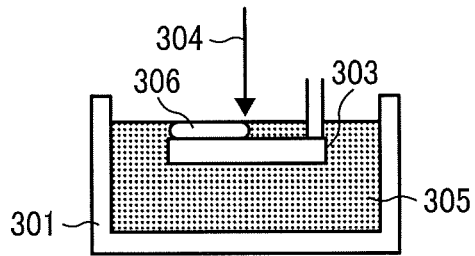
FIGS. 3A to 3D are schematic views illustrating an image forming device of the present disclosure.
Figure 3B:
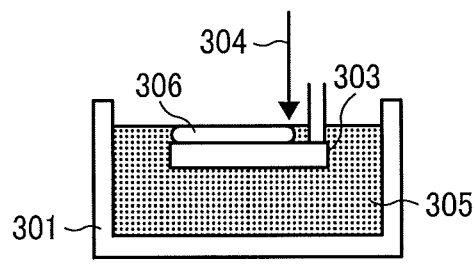
Figure 3C:
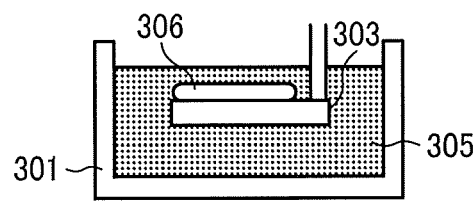
Figure 3D:
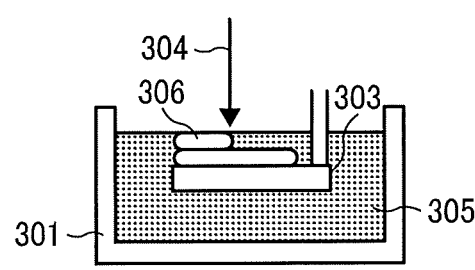

Furthermore, the curable composition of the present disclosure can be used as an ink to form two-dimensional texts, images, and designed coating film on various substrates and in addition as a three-dimensional object forming material to form a three-dimensional object. This three-dimensional object forming material may also be used as a binder for powder particles used in a powder layer laminating method of forming a three-dimensional object by repeating curing and layer-forming of powder layers, and as a three-dimensional object constituent material (a model material) and a support material used in an additive manufacturing method (a stereolithography method) as illustrated in FIG. 2 and FIGS. 3A to 3D. FIG. 2 is a diagram illustrating a method of additive manufacturing to sequentially form layers of the curable composition of the present disclosure one on top of the other by repeating discharging the curable composition to particular areas followed by curing upon irradiation of an active energy ray. FIGS. 3A to 3D are each a diagram illustrating a method of additive manufacturing to sequentially form cured layers 306 having respective predetermined forms one on top of the other on a movable stage 303 by irradiating a storing pool (storing part) 301 of the curable composition 305 of the present disclosure with the active energy ray 304.

An apparatus for fabricating a three-dimensional object by the curable composition of the present disclosure is not particularly limited and can be a known apparatus. For example, the apparatus includes a containing device, a supplying device, and a discharging device of the curable composition, and an active energy ray irradiator.

In addition, the present disclosure includes cured materials obtained by curing the curable composition and processed products obtained by processing structures having the cured materials on a substrate. The processed product is fabricated by, for example, heat-drawing and punching a cured material or structure having a sheet-like form or film-like form. Examples thereof are gauges or operation panels of vehicles, office machines, electric and electronic machines, and cameras. The substrate is not particularly limited. It can suitably be selected to a particular application. Examples thereof include paper, thread, fiber, fabrics, leather, metal, plastic, glass, wood, ceramic, or composite materials thereof. Of these, plastic substrates are preferred in terms of processability.

<Composition Storing Container>

The composition storing container of the present disclosure contains the curable composition and is suitable for the applications as described above. For example, if the curable composition of the present disclosure is used for ink, a container that stores the ink can be used as an ink cartridge or an ink bottle. Therefore, users can avoid direct contact with the ink during operations such as transfer or replacement of the ink, so that fingers and clothes are prevented from contamination. Furthermore, inclusion of foreign matters such as dust in the ink can be prevented. In addition, the container can be of any size, any form, and any material. For example, the container can be designed to a particular application. It is preferable to use a light blocking material to block the light or cover a container with a light blocking sheet, etc.

An image forming method of the present disclosure may be performed using an active energy ray and/or while applying heat. The image forming method in accordance with some embodiments of the present invention includes at least an irradiating step of irradiating the curable composition of the present disclosure with an active energy ray to cure the curable composition. The image forming apparatus of the present disclosure includes at least an irradiator to irradiate the curable composition of the present disclosure with an active energy ray and a storing part containing the curable composition of the present disclosure. The storing part may include the container mentioned above. Furthermore, the method and the apparatus may respectively include a discharging step and a discharging device to discharge the curable composition. The method of discharging the curable composition is not particularly limited, and examples thereof include a continuous jetting method and an on-demand method. The on-demand method includes a piezo method, a thermal method, an electrostatic method, etc.

FIG. 1 is a diagram illustrating a two-dimensional image forming apparatus equipped with an inkjet discharging device. Printing units 323a, 323b, 323c, and 323d respectively having ink cartridges and discharging heads for yellow, magenta, cyan, and black curable inks discharge the inks onto a recording medium 322 fed from a supplying roller 321. Thereafter, light sources 324a, 324b, 324c, and 324d configured to cure the inks emit active energy rays to the inks, thereby curing the inks to form a color image. Thereafter, the recording medium 322 is conveyed to a processing unit 325 and a printed matter reeling roll 326. Each of the printing unit 323a, 323b, 323c and 323d may have a heating mechanism to liquidize the ink at the ink discharging portion. Moreover, in another embodiment of the present disclosure, a mechanism may optionally be included to cool down the recording medium to around room temperature in a contact or non-contact manner. In addition, the inkjet recording method may be either of serial methods or line methods. The serial methods include discharging an ink onto a recording medium by moving the head while the recording medium intermittently moves according to the width of a discharging head. The line methods include discharging an ink onto a recording medium from a discharging head held at a fixed position while the recording medium continuously moves.

The recording medium 322 is not particularly limited. Specific examples thereof include, but are not limited to, paper, film, ceramics, glass, metal, and composite materials thereof, each of which may be in the form of a sheet. The image forming apparatus may have a one-side printing configuration and/or a two-side printing configuration. The recording medium is not limited to articles used as typical recording media. Examples of articles usable as the recording medium include cardboard, building materials (such as wall paper and floor material), concrete, cloth for apparel (such as T-shirts), textile, and leather as the recording medium.

Optionally, multiple colors can be printed with no or weak active energy ray from the light sources 324a, 324b, and 234c followed by irradiation of the active energy ray from the light source 324d. As a result, energy and cost can be saved.

The recorded matter having images printed with the ink of the present disclosure includes articles having printed images or texts on a plain surface of conventional paper, resin film, etc., a rough surface, or a surface made of various materials such as metal or ceramic. In addition, by laminating layers of images in part or the entire of a recording medium, a partially stereoscopic image (formed of two dimensional part and three-dimensional part) and a three dimensional objects can be fabricated.

FIG. 2 is a schematic diagram illustrating another example of the image forming apparatus (apparatus to fabricate a three-dimensional (3D) object) of the present disclosure. An image forming apparatus 339 illustrated in FIG. 2 sequentially forms thin layers one on top of the other using a head unit having inkjet heads arranged movable in the directions indicated by the arrows A and B. In the image forming apparatus 339, a discharge head unit 330 for additive manufacturing discharges a first curable composition, and discharge head units 331 and 332 for support discharges a second curable composition having a different composition from the first curable composition, while ultraviolet irradiators 333 and 334 adjacent to the discharge head units 331 and 332 cure the compositions.

To be more specific, for example, after the discharge head units 331 and 332 for support discharge the second curable composition onto a substrate 337 for additive manufacturing and the second curable composition is solidified by irradiation of an active energy ray to form a first substrate layer having a reservoir for composition, the discharge head unit 330 for additive manufacturing discharges the first curable composition onto the reservoir followed by irradiation of an active energy ray for solidification, thereby forming a first additive manufacturing layer. This step is repeated multiple times lowering a stage 338 movable in the vertical direction to laminate the supporting layer and the additive manufacturing layer to fabricate a solid object 335. Thereafter, an additive manufacturing support 336 is removed, if desired. Although only a single discharge head unit 330 for additive manufacturing is provided to the image forming apparatus 339 illustrated in FIG. 2, it can have two or more units 330.

<Device for Discharging Liquid>

As a result of keen examination, the inventors of the present disclosure discovered that a cured product which have a combination of an excellent stretchability and a high hardness could be obtained by discharging the ink comprising the above stated curable composition using a device for discharging liquid comprising a liquid discharge head having the circulation mechanism to be described below.

The device for discharging liquid of the present disclosure is comprised of a liquid discharge head comprising the above-mentioned curable composition, individual liquid chambers having circulation channels in which the curable composition circulates, and a nozzle communicated with the individual liquid chambers and configured to discharge droplets. The device further comprises other members in accordance with need.

Preferably, the liquid discharge head further comprises a pressure sensor for detecting the pressure of the curable composition, and a circulation rate controller for controlling the circulation rate of the curable to adjusts the pressure of the curable composition to a target pressure. Thereby, the device for discharging liquid can suppress the sedimentation of the particles, and can maintain a uniform dispersion.

When the detection value of the pressure sensor is smaller than the target pressure, the circulation rate controller preferably increases the circulation rate for suppressing the sedimentation of the particles.

Below, the embodiments of the present disclosure will be described with reference to attached drawings.

Figure 4:
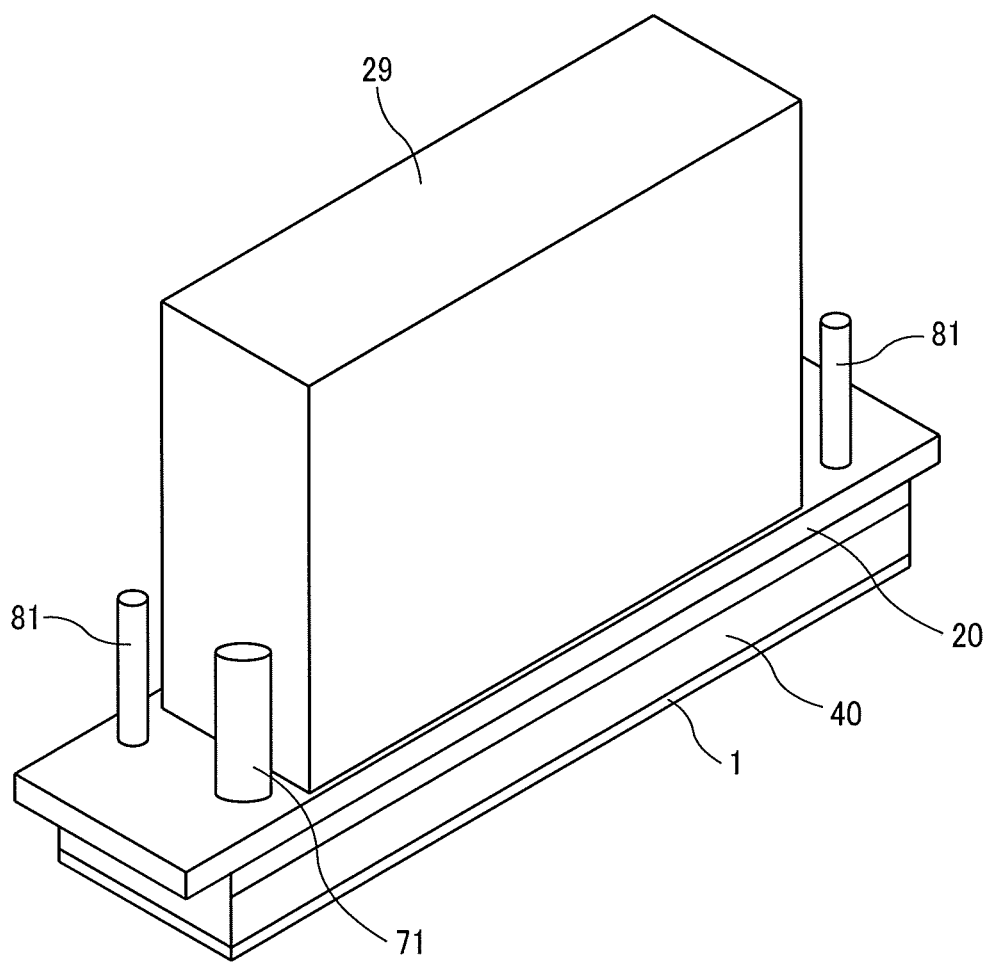
FIG. 4 is an external perspective view illustrating an ink discharge head of the device for discharging liquid of the present disclosure.
Figure 5:
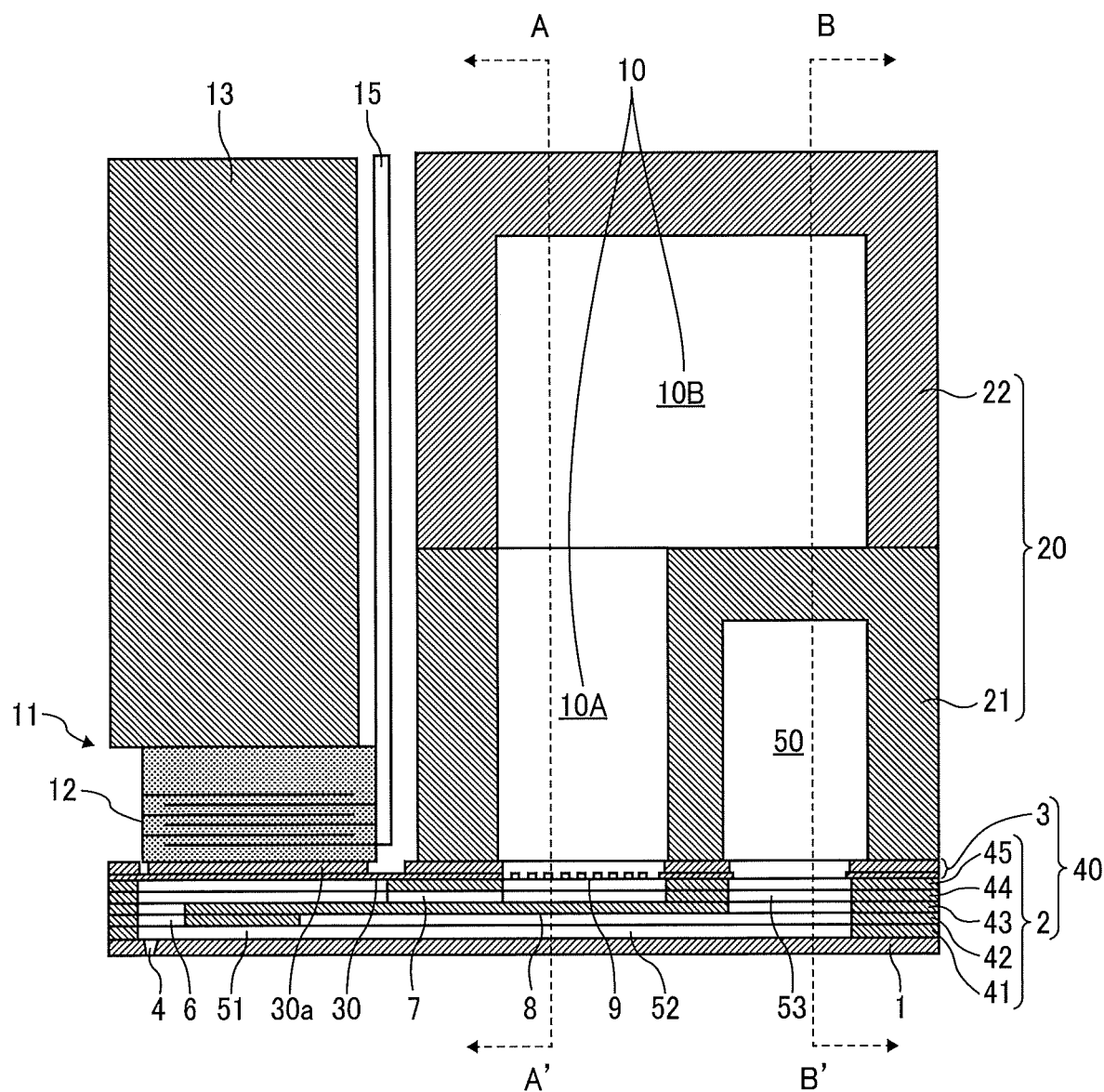
FIG. 5 is a cross-sectional view in the direction orthogonal to a nozzle alignment direction of the ink discharge head of the device for discharging liquid of the present disclosure.
Figure 6:
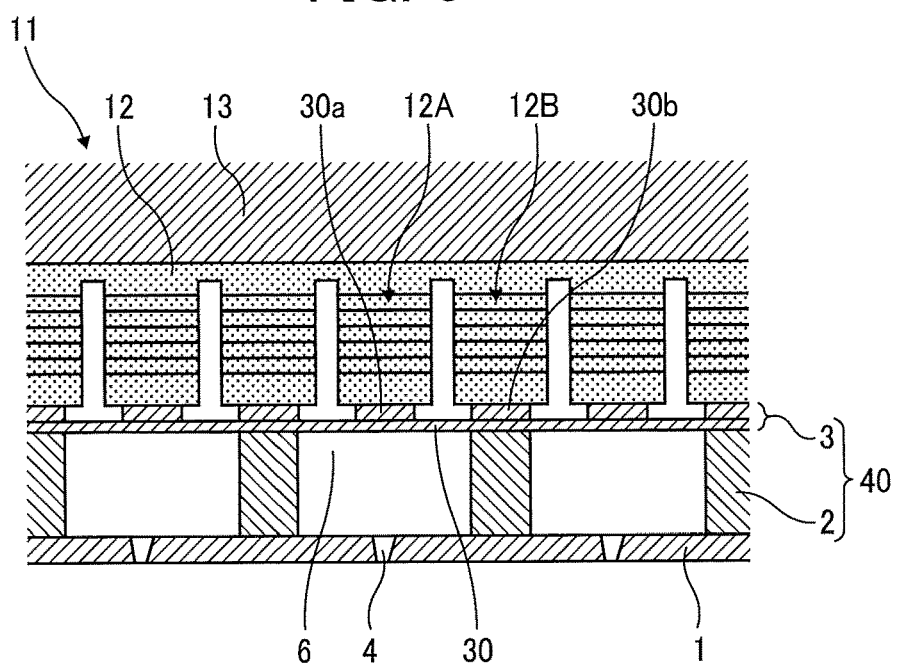
FIG. 6 is a partial cross-sectional view in the direction parallel to the nozzle alignment direction of the ink discharge head of the device for discharging liquid of the present disclosure.
Figure 7:
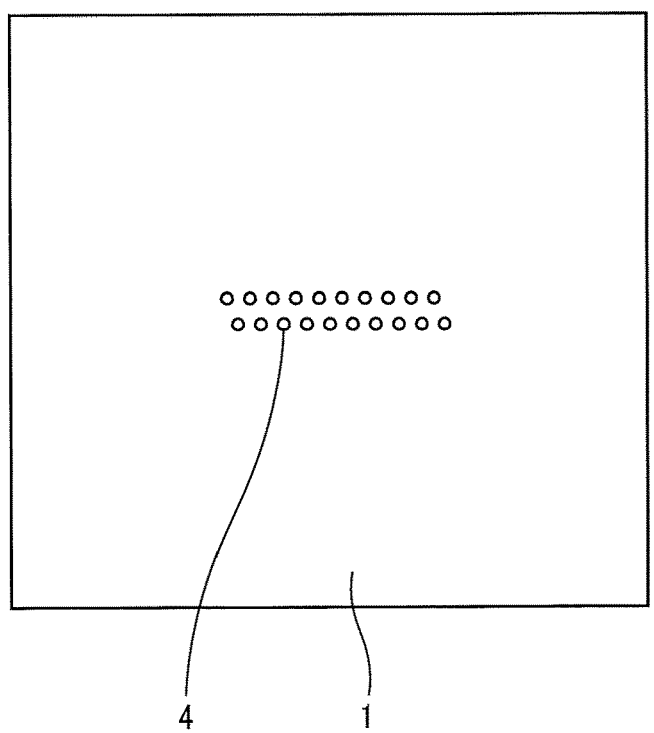
FIG. 7 is a plan view of a nozzle plate of the ink discharge head of the device for discharging liquid of the present disclosure.
Figure 9A:
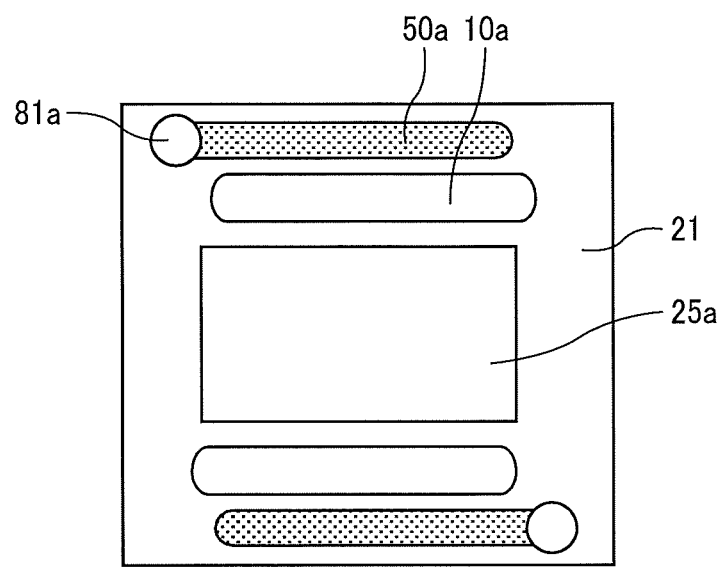
FIG. 9A is a plan view of each member constituting a common liquid chamber member of the ink discharge head of the device for discharging liquid of the present disclosure.
Figure 9B:
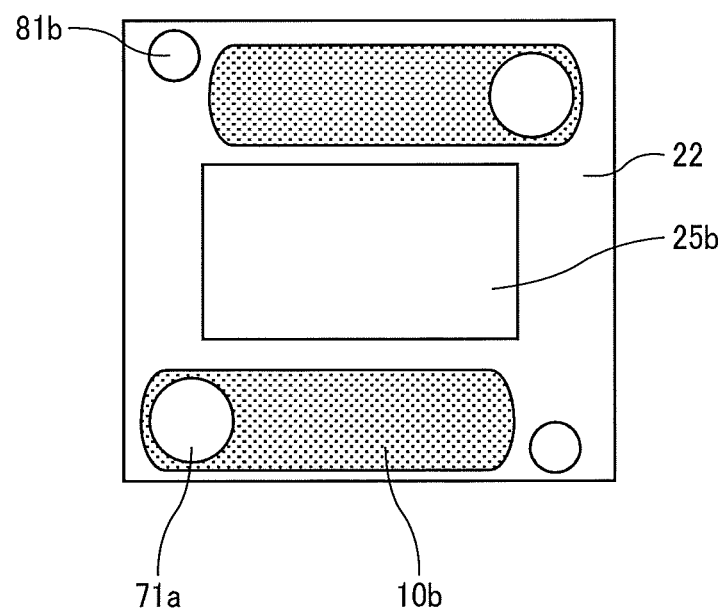
FIG. 9B is a plan view of each member constituting the common liquid chamber member of the ink discharge head of the device for discharging liquid of the present disclosure.
Figure 10:
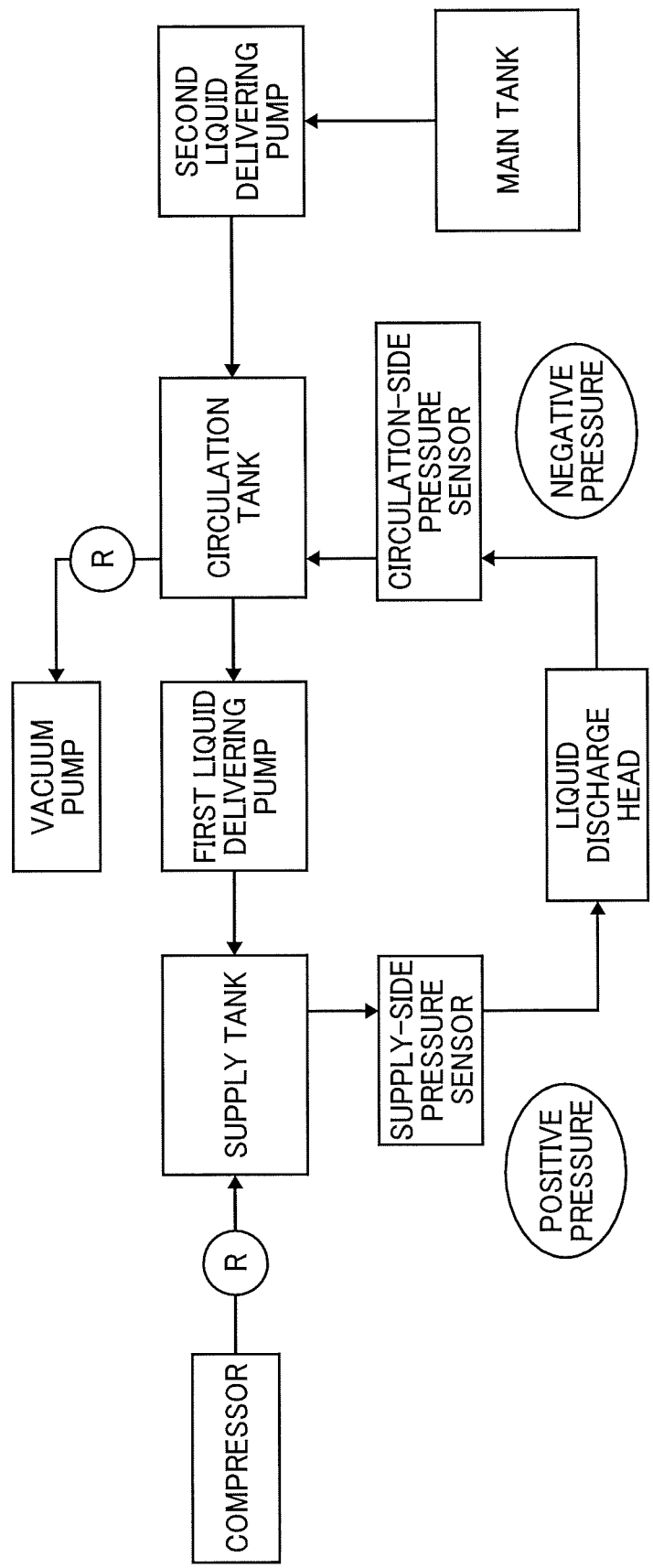
FIG. 10 is a block diagram illustrating a liquid circulation system of the present disclosure.
Figure 11:
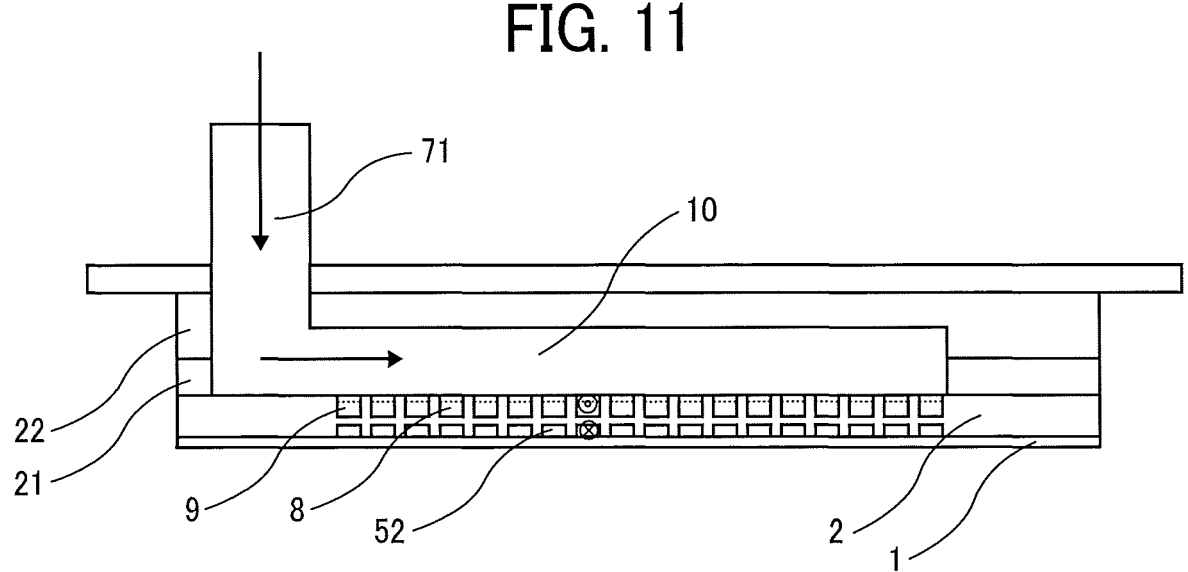
FIG. 11 is a cross-sectional view taken along line A-A' of FIG. 5.
Figure 12:
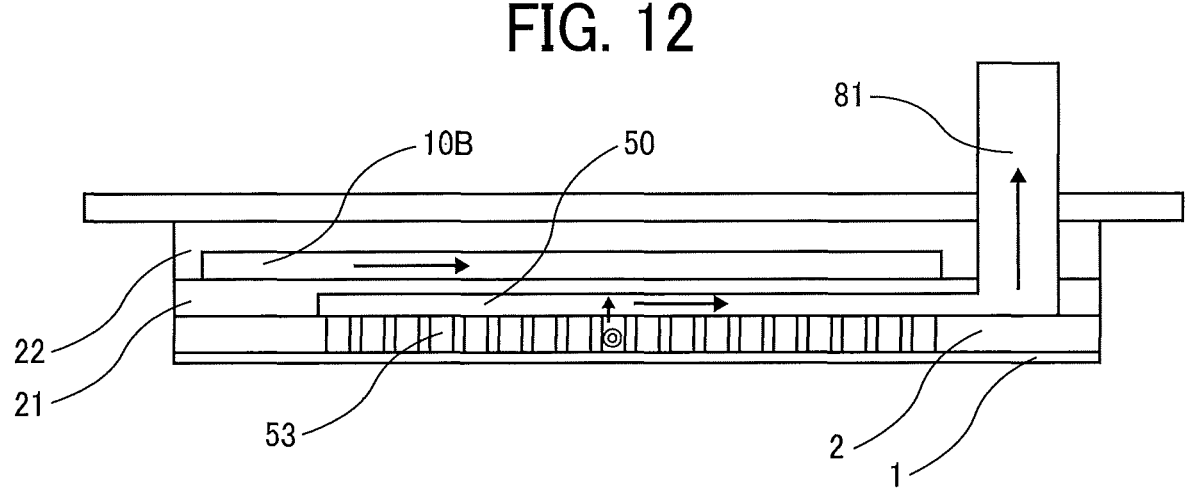
FIG. 12 is a cross-sectional view taken along line B-B' of FIG. 5.

An example of the liquid discharge head according to an embodiment of the present disclosure is described with reference to FIGS. 4 to 12. FIG. 4 is an external perspective view of the liquid discharge head according to an embodiment of the present disclosure, FIG. 5 is a cross-sectional view of the liquid discharge head in the direction orthogonal to the nozzle alignment direction, FIG. 6 is a cross-sectional view of the liquid discharge head in the direction parallel to the nozzle alignment direction, FIG. 7 is a plan view of the nozzle plate of the liquid discharge head, FIGS. 8A to 8F are plan views of respective members constituting the channel member of the liquid discharge head, and FIG. 9A and FIG. 9B are plan views of respective members constituting the common liquid chamber member of the liquid discharge head. FIG. 10 is a block diagram illustrating an example of a liquid circulation system of the present disclosure. FIG. 11 is a cross-sectional view along line A-A' of FIG. 5, and FIG. 12 is a cross-sectional view along line B-B' of FIG. 5.

The liquid discharge head is laminated and joined with a nozzle plate 1, a channel plate 2, and a diaphragm member 3 as a wall surface. Moreover, the liquid discharge head is provided with a piezoelectric actuator 11 for causing displacement of the diaphragm member 3, a common liquid chamber member 20, and a cover 29.

The nozzle plate 1 has a plurality of nozzles 4 for discharging the liquid.

The channel plate 2 forms individual liquid chambers 6 communicated with the nozzle 4, a fluid resistance portion 7 communicated with the individual liquid chambers 6, and a liquid introduction portion 8 communicated with the fluid resistance portion 7. Further, the channel plate 2 is formed by laminating and joining multiple plate members 41 to 45 from the nozzle plate 1 side, and the channel member 40 is constituted by laminating and joining these plate members 41 to 45 with the diaphragm member 3.

The diaphragm member 3 includes a filter portion 9 as an opening for communicating the liquid introduction portion 8 with a common liquid chamber 10 formed by the common liquid chamber member 20.

The diaphragm member 3 is a wall surface member which forms a wall surface of the individual liquid chambers 6 of the channel plate 2. The diaphragm member 3 is formed as a two-layer structure (however, it is not limited thereto) by a first layer which forms a thin portion from the channel plate 2 side and a second layer which forms a thick portion, and deformable vibration areas 30 are formed on the first layer in the portion corresponding to the individual liquid chambers 6.

Here, as shown in FIG. 7, a plurality of nozzles 4 are aligned in a zig-zag manner on the nozzle plate 1.

Figure 8A:
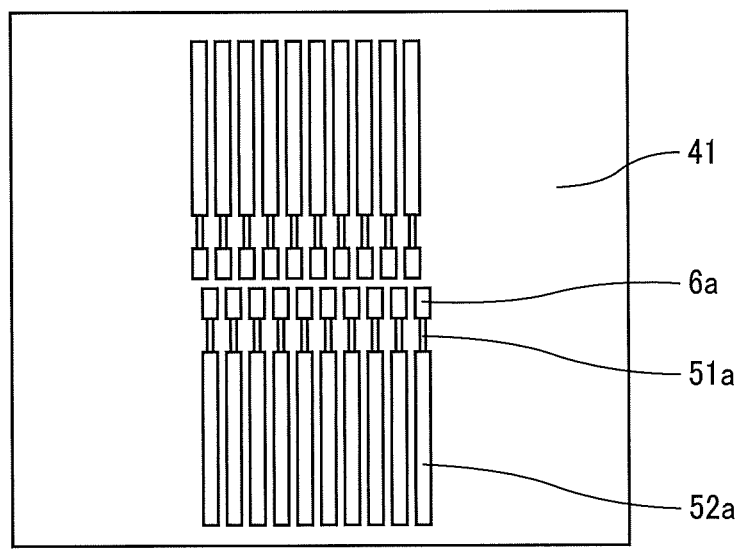
FIG. 8A is a plan view of each member constituting a channel member of the ink discharge head of the device for discharging liquid of the present disclosure.

As shown in FIG. 8A, a through groove portion (meaning a groove-shaped through-hole) 6a constituting the individual liquid chambers 6, and through groove portions 51a and 52a constituting the fluid resistance portions 51 and the circulation channels 52 are formed on the plate member 41 which constitutes the channel plate 2.

Figure 8B:
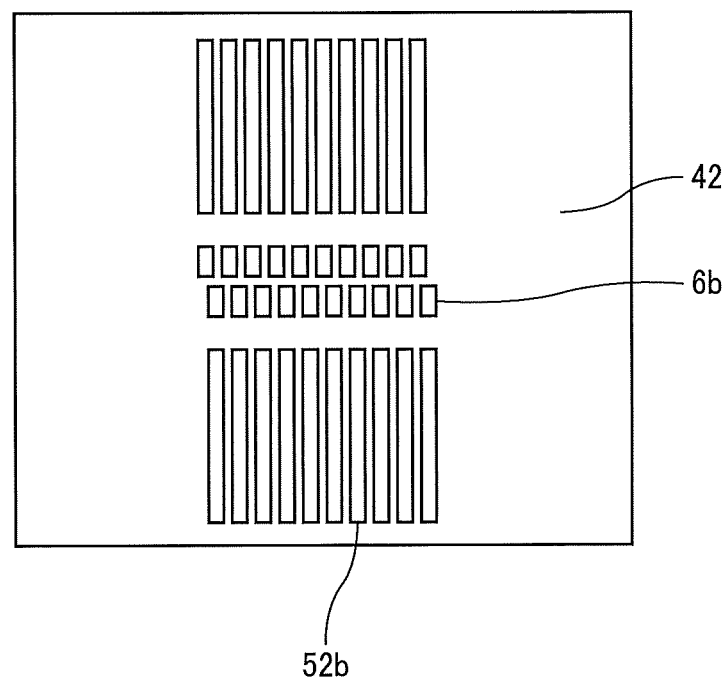
FIG. 8B is a plan view of each member constituting the channel member of the ink discharge head of the device for discharging liquid of the present disclosure.

As shown in FIG. 8B, a through groove portion 6b constituting the individual liquid chambers 6 and a through groove portion 52b constituting the circulation channels 52 are formed on the plate member 42 in the same manner.

Figure 8C:
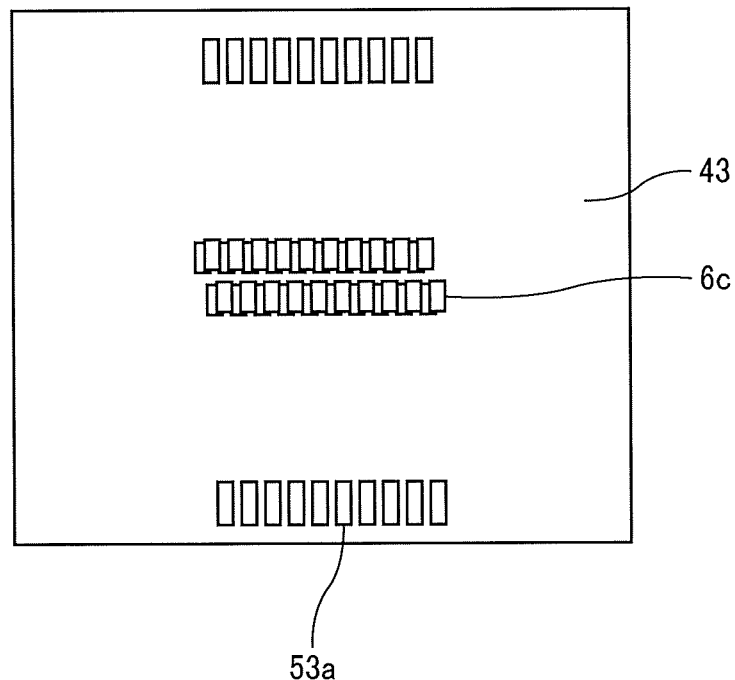
FIG. 8C is a plan view of each member constituting the channel member of the ink discharge head of the device for discharging liquid of the present disclosure.

As shown in FIG. 8C, a through groove portion 6c constituting the individual liquid chambers 6 and a through groove portion 53a constituting the circulation channels 53 in which the longitudinal direction is coincident with the nozzle alignment direction are formed on the plate member 43 in the same manner.

Figure 8D:
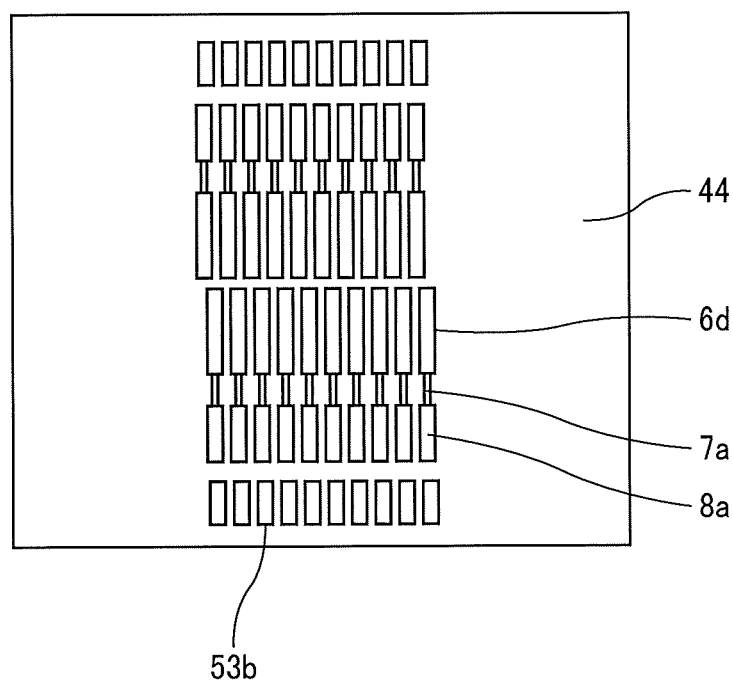
FIG. 8D is a plan view of each member constituting the channel member of the ink discharge head of the device for discharging liquid of the present disclosure.

As shown in FIG. 8D, a through groove portion 6d constituting the individual liquid chambers 6, a through groove portion 7a which becomes the fluid resistance portion 7, a through groove portion 8a constituting the liquid introduction portion 8, and a through groove portion 53b constituting the circulation channels 53 in which the longitudinal direction is coincident with the nozzle alignment direction are formed on the plate member 44 in the same manner.

Figure 8E:
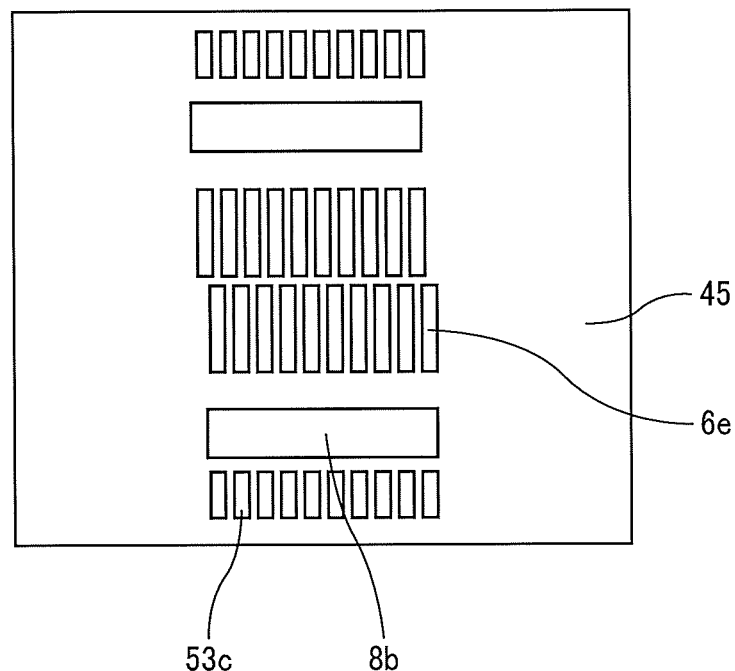
FIG. 8E is a plan view of each member constituting the channel member of the ink discharge head of the device for discharging liquid of the present disclosure.

As shown in FIG. 8E, a through groove portion 6e constituting the individual liquid chambers 6, a through groove portion 8b (to become the liquid chamber downstream of the filter) constituting the liquid introduction portion 8 in which the longitudinal direction is coincident with the nozzle alignment direction is, and the through groove portion 53c constituting the circulation channels 53 in which the longitudinal direction is coincident with the nozzle alignment direction are formed on the plate member 45 in the same manner.

Figure 8F:
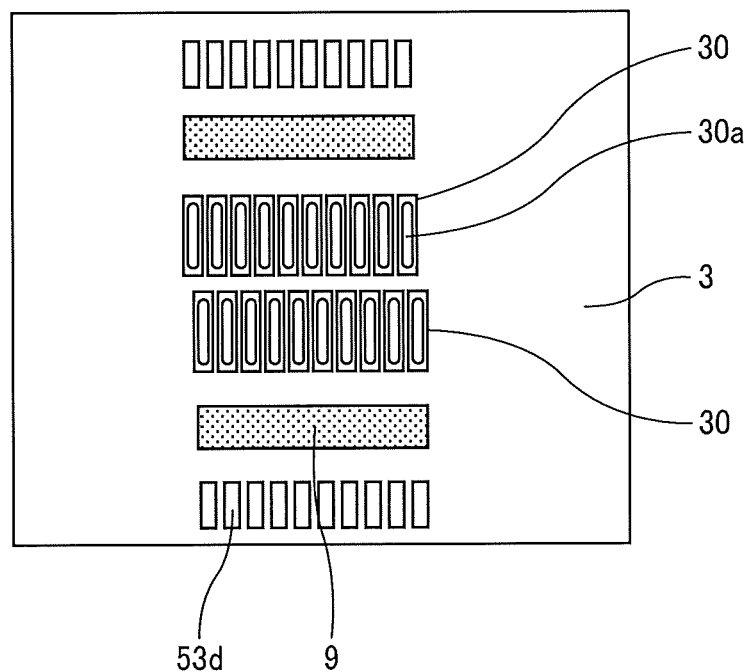
FIG. 8F is a plan view of each member constituting the channel member of the ink discharge head of the device for discharging liquid of the present disclosure.

As shown in FIG. 8F, the vibration areas 30, the filter portion 9, and a through groove portion 53d constituting the circulation channels 53 in which the longitudinal direction is coincident with the nozzle alignment direction are formed on the diaphragm member 3.

Therefore, by laminating and joining a plurality of the plate members to configure the channel member, it is possible to form complicated channels with a simple configuration.

By the above-mentioned configuration, a fluid resistance portion 51 along the surface direction of the channel plate 2 passing through each of the individual liquid chambers 6, a circulation channel 52 and a circulation channel 53 in the thickness direction of the channel member 40 passing through the circulation channel 52 are formed in the channel member 40 consisting of the channel plate 2 and the diaphragm member 3. Note that, the circulation channel 53 passes through the circulation common liquid chamber 50 which will be described later.

On the one hand, the common liquid chamber 10 to which the liquid from a supply-circulation mechanism 494 is supplied and the circulation common liquid chamber 50 are formed in the common liquid chamber member 20.

As shown in FIG. 9A, a through-hole 25*a* for a piezoelectric actuator, the through groove portions 10*a* to become the downstream common liquid chamber 10A, and groove parts 50*a* having a bottom to become the circulation common liquid chamber 50 are formed in the first common liquid chamber member 21 constituting the common liquid chamber member 20.

As shown in FIG. 9B, a through-hole 25*b* for a piezoelectric actuator and groove parts 10*b* to become the upstream common liquid chamber 10B are formed in the same second common liquid chamber member 22.

Further, with reference to FIG. 4, through-holes 71*a* to become the supply port portions passing through an end of the nozzle alignment direction of the common liquid chamber 10 and the supply port 71 are formed in the second common liquid chamber member 22.

Similarly, through-holes 81*a* and 81*b* passing through the other end (the end opposite to through-hole 71*a*) of the nozzle alignment direction of the circulation common liquid chamber 50 and the circulation port 81 are formed in the first common liquid chamber member 21 and the second common liquid chamber member 22.

Note that, in FIG. 9A and FIG. 9B, the groove parts having a bottom are illustrated by the hatched portions (the same in the following drawings).

Therefore, the common liquid chamber member 20 is constituted by the first common liquid chamber member 21 and the second common liquid chamber member 22, the first common liquid chamber member 21 is joined to the diaphragm member 3 side of the channel member 40, and the second common liquid chamber member 22 is joined to the first common liquid chamber member 21.

Here, the first common liquid chamber member 21 is formed with a downstream common liquid chamber 10A which is a part of the common liquid chamber 10 passing through the liquid introduction portion 8, and the circulation common liquid chamber 50 passing through the circulation channels 53. Further, the second common liquid chamber member 22 is formed with an upstream common liquid chamber 10B which is the remainder of the common liquid chamber 10.

At this time, the downstream common liquid chamber 10A which is the part of the common liquid chamber 10 and the circulation common liquid chamber 50 are arranged in parallel in the direction orthogonal to the nozzle alignment direction, and the circulation common liquid chamber 50 is arranged in a position to be projected inside the common liquid chamber 10.

Therefore, the dimensions of the circulation common liquid chamber 50 are not restrained due to the dimensions necessary for the channel including the individual liquid chambers 6, the fluid resistance portions 7 and the liquid introduction portion 8 which are formed in the channel member 40.

Moreover, by arranging the circulation common liquid chamber 50 and a part of the common liquid chamber 10 in parallel, and arranging the circulation common liquid chamber 50 in a position to be projected inside the common liquid chamber 10, the width of the head can be controlled in the direction orthogonal to the nozzle alignment direction, and the size increase of the head can be prevented. The common liquid chamber member 20 forms the common liquid chamber 10 and the circulation common liquid chamber 50 to which a liquid is supplied from the head tank and the liquid cartridge.

On the one hand, the piezoelectric actuator 11 which includes an electro-mechanical conversion element as a driving unit for deforming the vibration areas 30 of the diaphragm member 3 is arranged on the side opposite to the individual liquid chambers 6 of the diaphragm member 3.

As shown in FIG. 6, the piezoelectric actuator 11 includes a piezoelectric member that is joined to a base member 13, and a desired number of pillar-shaped piezoelectric elements 12A and 12B are formed in a comb-teeth shape at predetermined intervals on one piezoelectric member by subjecting the piezoelectric member to groove processing by half cut dicing.

Here, the piezoelectric element 12A is driven in accordance with the application of a driving waveform, and the piezoelectric element 12B is simply used as a support to which no driving waveform is applied, but both of the piezoelectric elements 12A and 12B can be used as piezoelectric elements to be driven.

Moreover, piezoelectric element 12A is joined to a convex portion 30*a* which is an island-shaped thick portion formed on a vibration area 30 of the diaphragm member 3. Further, the piezoelectric element 12B is joined to a convex portion 30*b* which is a thick portion of the diaphragm member 3.

The piezoelectric member includes piezoelectric layers and internal electrodes that are alternately laminated, and the internal electrodes are drawn out of an end surface to form external electrodes, to which a flexible wiring member 15 is connected.

As the liquid discharge head configured as above, for example, by decreasing the voltage applied to a piezoelectric element 12A from the reference voltage, the piezoelectric element 12A is compressed, the vibration areas 30 of the diaphragm member 3 is lowered such that the volume of the individual liquid chambers 6 enlarges, and consequently, the liquid flows into the individual liquid chambers 6.

Then, the voltage applied to the piezoelectric element 12A is increased to extend the piezoelectric element 12A in the layering direction, so that the vibration areas 30 of the diaphragm member 3 is deformed in the direction towards the nozzle 4 to compress the volume of the individual liquid chambers 6, and consequently, the liquid within the individual liquid chambers 6 is pressurized, and the liquid is discharged from the nozzle 4.

Moreover, the liquid is drawn from the common liquid chamber 10 due to the surface tension and the liquid is filled. Finally, the meniscus surface becomes stable due to the balance between the negative pressure prescribed by the supply tank, the circulation tank and the water head difference and the surface tension of the meniscus, so that it is possible to move to the next discharge operation.

Note that, the method of driving the head is not limited to the above-mentioned example (pull to push), and the pull or push can be performed by the way in which the drive waveform is applied. Further, in the abovementioned embodiment, it is described that a multilayer piezoelectric element is used as a pressure generating means to provide a pressure fluctuation to the individual liquid chambers 6, but the pressure generating means is not limited thereto, and it is also possible to use a thin film piezoelectric element. Furthermore, it is possible to use a means in which a heating resistor is disposed inside the individual liquid chambers 6, and bubbles are generated by the heat generation of the heating resistor to provide the pressure fluctuation, or a means in which the electrostatic force is used to produce the pressure fluctuation.

Next, an example of the liquid circulation system using liquid discharge head according to the-present embodiment will be described using FIG. 10.

FIG. 10 is a block diagram illustrating the liquid circulation system according to the-present embodiment.

As shown in FIG. 10, the liquid circulation system is constituted by a main tank, a liquid discharge head, a supply tank, a circulation tank, a compressor, a vacuum pump, a liquid delivering pump, a regulator (R), a supply-side pressure sensor, a circulation-side pressure sensor and the like, and furthermore, consists of a circulation rate control unit which adjusts the overall ink circulation rate. The supply-side pressure sensor is arranged between the supply tank and the liquid discharge head, and is connected to a supply channel which is connected to the supply port 71 of the liquid discharge head (refer to FIG. 4). The circulation-side pressure sensor is arranged between the liquid discharge head and the circulation tank, and is connected to a circulation channel which is connected to a circulation port 81 of the liquid discharge head (refer to FIG. 4).

One end of the circulation tank is connected to the supply tank via the first liquid delivering pump, and the other end of the circulation tank is connected to the main tank via the second liquid delivering pump. Accordingly, the liquid flows from the supply tank to the liquid discharging head via the supply port 71, and is ejected into the circulation tank via the circulation port, and furthermore, the liquid is sent from the circulation tank to the supply tank via the first liquid delivering pump, so that the liquid is circulated.

Further, the compressor is connected to the supply tank, and is controlled so that the supply-side pressure sensor detects a predetermined positive pressure. On the one hand, the vacuum pump connected to the circulation tank is controlled so that the circulation-side pressure sensor detects a predetermined negative pressure. Accordingly, while the liquid flowing through the liquid discharging head is circulated, the negative pressure of the meniscus can be maintained constant.

Further, when the nozzle of the liquid discharge head discharges the liquid, the amount of liquid in the supply tank and the circulation tank decreases, thus, it is preferable that the circulation tank is replenished with liquid from the main tank using the second liquid delivering pump. The timing of the liquid replenishment from the main tank to the circulation tank may be controlled, based on a detection result of a liquid surface sensor, etc., provided inside the circulation tank, such that liquid replenishment is conducted when liquid surface of ink inside the circulation tank is lower than a predetermined level.

Next, the circulation of the liquid within the liquid discharge head will be described. As shown in FIG. 4, the supply port 71 in communication with the common liquid chamber, and the circulation port 81 in communication with the circulation common liquid chamber 50 are formed at the end of the common liquid chamber member 20. The supply port 71 and the circulation port 81 are respectively connected via tubes to the supply tank and the circulation tank (refer to FIG. 10) which store the liquid. Moreover, the liquid stored in the supply tank is supplied to the individual liquid chambers 6 through the supply port 71, the common liquid chamber 10, the liquid introduction portion 8, and the fluid resistance portions 7.

Furthermore, the liquid within the individual liquid chambers 6 is discharged from the nozzle 4 by the driving of the piezoelectric element 12, while a part or all of the liquid which was not discharged and remained in the individual liquid chambers 6 is circulated to the circulation tank through the fluid resistance portions 51, the circulation channels 52 and 53, the circulation common liquid chamber 50, and the circulation port 81.

Note that, the circulation of the liquid is performed not only during the operation of the liquid discharge head, but also when the liquid discharge head is not operating. Circulating when the liquid discharge head is not operating is preferable as the liquid inside the individual liquid chambers is always refreshed, and the aggregation and the sedimentation of the components contained in the liquid can be suppressed.

Furthermore, in the case when there are particles which tend to settle in the ink such as in the present disclosure, if the circulation rate of the ink is slow, the sedimentation and adhesion of the particles may occur on the inside of the circulation channels. Therefore, the resistance on the inside of the circulation channels becomes strong, thus, the detection value at the supply-side pressure sensor or the circulation-side pressure sensor becomes small.

In this case, it is possible to eliminate the sedimentation by controlling so as to increase the circulation rate of the ink.

Specifically, when the detection value at the supply-side pressure sensor or the circulation-side pressure sensor decreases to a preset lower limit target value (as an example, less than half the normal pressure), the flow rate is controlled so as to raise the pressure to the target pressure at a preset pressure change rate. The increased flow rate is maintained until a predetermined time elapses from the time when the detection value reached the target pressure. Therefore, it is possible to eliminate the sedimentation.

Figure 13:
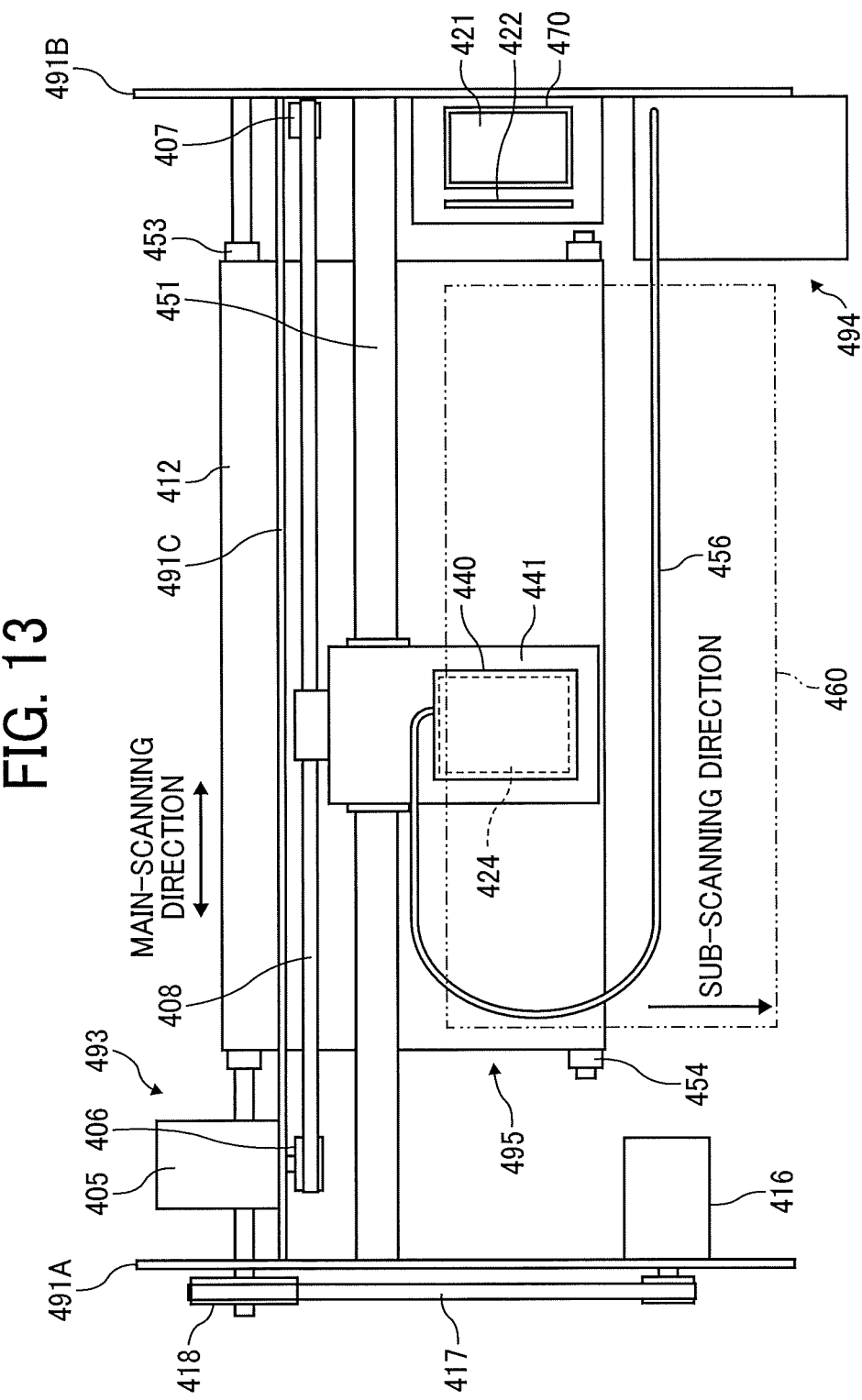
FIG. 13 is a plan view the device for discharging liquid of the present disclosure.
Figure 14:
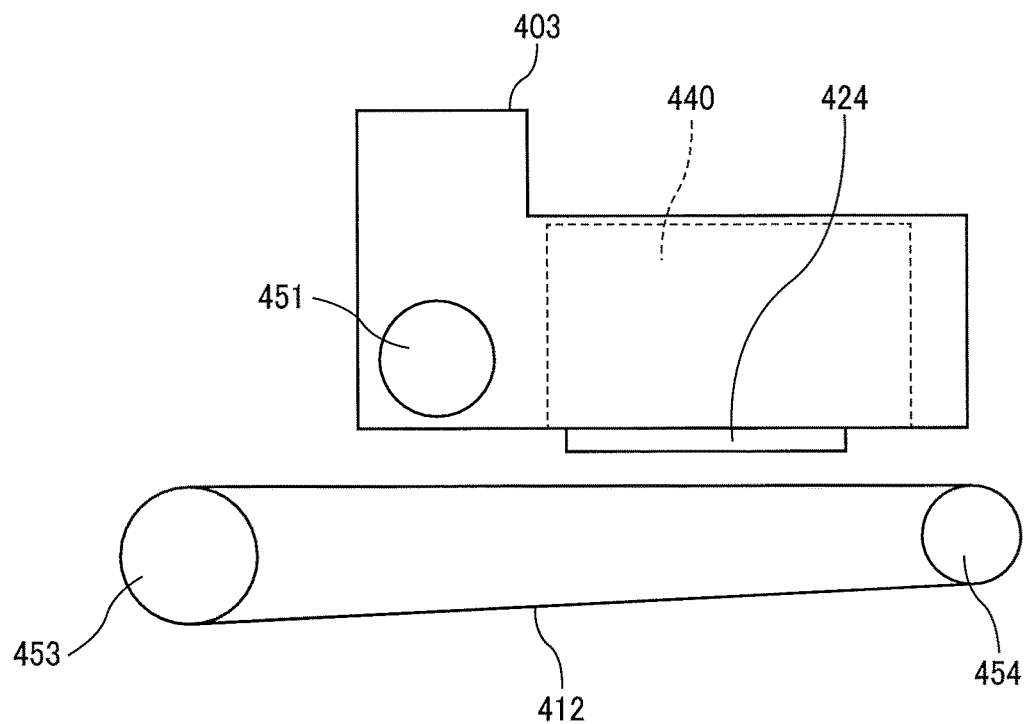
FIG. 14 is an explanatory side view of the device for discharging liquid of the present disclosure.

Next, an example of the device for discharging liquid according to the present disclosure will be explained with reference to FIG. 13 and FIG. 14. FIG. 13 is a plan view of the device for discharging liquid, and FIG. 14 is an explanatory side view of the device for discharging liquid.

The device for discharging liquid is a serial type device, and a carriage 403 moves reciprocatingly in the main-scanning direction by a main-scanning movement mechanism 493. The main-scanning movement mechanism 493 includes a guide member 401, a main-scanning motor 405, and a timing belt 408, etc. The guide member 401 is stretched over the left and right side plates 491A and 491B to movably hold the carriage 403. Moreover, the main-scanning motor 405 reciprocally moves the carriage 403 in the main-scanning direction via a timing belt 408 stretched between a driving pulley 406 and a driven pulley 407.

A liquid discharging unit 440 on which the liquid discharge head 404 according to the present disclosure was mounted is mounted in the carriage 403. The liquid discharge head 404 of the liquid discharging unit 440 discharges the liquids of each color, for example, yellow (Y), cyan (C), magenta (M), and black (K). Further, the liquid discharge head 404 arranges a nozzle row comprising a plurality of nozzles in the sub-scanning direction orthogonal to the main-scanning direction, and is mounted so that the discharge direction faces downwards.

The liquid is supplied and circulated within the liquid discharge head 404 by a supply-circulation mechanism 494 for supplying the liquid stored outside the liquid discharge head 404 to the liquid discharge head 404. Note that, in the present example, the supply-circulation mechanism 494 is constituted by the supply tank, the circulation tank, the compressor, the vacuum pump, the liquid delivering pump, the regulator (R), etc. Further, the supply-side pressure sensor is connected to a supply channel between the supply tank and the liquid discharge head, and is linked to the supply port 71 of liquid discharge head. The circulation-side pressure sensor is connected to the circulation channel between the liquid discharge head and the circulation tank, and is linked to the circulation port 81 of the liquid discharge head.

The device is provided with a conveyance mechanism 495 for conveying a sheet 410. The conveyance mechanism 495 includes a conveyer belt 412 which is a conveyance means, and a sub-scanning motor 416 for driving the conveyer belt 412.

The conveyer belt 412 adsorbs the sheet 410 to convey it to a position that faces the liquid discharge head 404. The conveyer belt 412 is an endless belt that is suspended between a conveyance roller 413 and a tension roller 414. The adsorption may be electrostatic adsorption, air absorption, etc.

Moreover, the conveyer belt 412 moves circularly in the sub-scanning direction by the sub-scanning motor 416 rotating and driving the conveyance roller 413 via a timing belt 417 and a timing pulley 418.

Furthermore, a maintenance/recovery mechanism 420 for maintenance and recovery of the liquid discharge head 404 on the side of the conveyer belt 412 is arranged on one side of the main-scanning direction of the carriage 403.

The maintenance/recovery mechanism 420 is constituted by, for example, a cap member 421 for capping the nozzle surface (the surface having the nozzles) of the liquid discharge head 404, and a wiper member 422 for wiping the nozzle surface.

The main-scanning movement mechanism 493, the supply-circulation mechanism 494, the maintenance/recovery mechanism 420, and the conveyance mechanism 495 are installed on a case including side plates 491A and 491B and a back plate 491C.

In the device having such configurations as described above, the sheet 410 is fed onto and adsorbed by the conveyer belt 412, and the sheet 410 is conveyed in the sub-scanning direction by the circular movement of the conveyer belt 412.

Then, by driving the liquid discharge head 404 in accordance with the image signal while moving the carriage 403 in the main-scanning direction, liquid is discharged on the sheet 410 which is not moving to form an image.

As described above, this device is provided with the liquid discharge head in accordance with the present disclosure, and thus, can stably form a high quality image.

Figure 15:
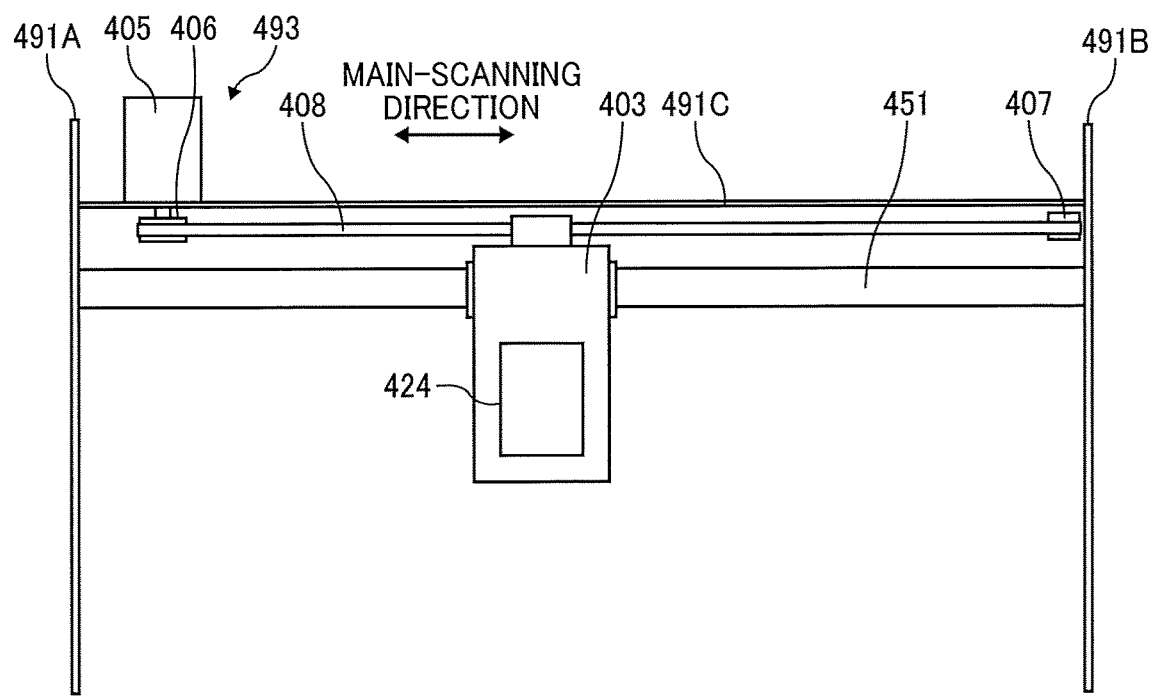
FIG. 15 is a plan view of an ink discharging unit of the device for discharging liquid of the present disclosure.

Next, other specific examples of the liquid discharging unit according to the present disclosure will be described with reference to FIG. 15. FIG. 15 is a plan view of the same unit.

The liquid discharging unit is constituted by, among the members constituting the device for discharging a liquid, a case portion constituted by the side plates 491A and 491B and the back plate 491C, the main-scanning movement mechanism 493, the carriage 403, and the liquid discharge head 404.

Note that, the liquid discharging unit can be constituted by further mounting at least one of the above-described maintenance/recovery mechanism 420 and the supply-circulation mechanism 494, for example, on the side plate 491B of the liquid discharging unit.

In the present disclosure, the "liquid discharge head" is a functional part for discharging or spraying a liquid from a nozzle.

The liquid to be discharged is not specifically limited as long as it has a viscosity and a surface tension capable of being discharged from the head, but the liquid may preferably have a viscosity of 30 mPa·s or less under a normal temperature and pressure or under heating or cooling. More specifically, specific examples of the liquid include a solution, a suspension, or an emulsion including a solvent, such as water or an organic solvent, a colorant such as dye or pigment, a polymerizable compound, a resin, a functional material such as a surfactant, a biocompatible material such as DNA, amino acid, protein, or calcium, and an edible material such as a natural colorant, and these can be used for, for example, an inkjet ink, a surface treatment solution, a liquid for forming components of electronic elements or light-emitting elements or a resist pattern of electronic circuits, or a material solution for three-dimensional fabrication.

The energy generating source for discharging the liquid may include a piezoelectric actuator (laminated piezoelectric member or thin film type piezoelectric member), a thermal actuator which uses an electricity-heat converting member such as a heating resistor, an electrostatic actuator configured with diaphragm and a counter electrode and the like.

The "liquid discharging unit" is a unit in which the functional parts and the mechanisms are integrated in the liquid discharge head, and is an assembly of parts relating to the discharging of liquid. For example, the "liquid discharging unit" may be a combination of the liquid discharge head and at least one constituent of the supply-circulation mechanism, the carriage, the maintenance/recovery mechanism, and the main-scanning movement mechanism.

Here, the term "integrate" means, for example, a liquid discharge head and functional parts or mechanisms are fastened, attached, engaged, etc., so as to be fixed to each other, and that one among a liquid discharge head and functional parts or mechanisms is supported by the other in a movable manner. Further, the liquid discharge head and the functional parts or the mechanisms may be configured to be attachable to or detachable from each other.

For example, the liquid discharging unit may be a unit in which the liquid discharge head is integrated with the supply-circulation mechanism. Further, the liquid discharging unit may be a unit in which the liquid discharge head is integrated with the supply-circulation mechanism by connecting to each other with tubes and the like. Here, a unit containing a filter can be included between the supply-circulation mechanism and the liquid discharge head of these liquid discharging units.

Further, the liquid discharging unit may be a unit in which the liquid discharge head is integrated with the carriage.

Further, the liquid discharging unit may be a unit which moveably supports the liquid discharge head by a guide member configured to be a part of the scanning movement mechanism so as to integrate the liquid discharge head with the scanning movement mechanism.

Further, the liquid discharging unit may be a unit in which a cap member which is a part of the maintenance/recovery mechanism is fixed to the carriage provided with the liquid discharging head to integrate the liquid discharge head and the carriage with the maintenance/recovery mechanism.

Further, the liquid discharging unit may be a unit in which tubes are connected to the liquid discharge head in which a supply-circulation mechanism or a channel part are provided to integrate the liquid discharge head with the supply mechanism. The liquid of the liquid storage source is supplied to the liquid discharge head via the tubes.

The main-scanning movement mechanism may be a guide member single body. Further, the supply mechanism may be tube single body or a loading unit single body.

In the present disclosure, the "device for discharging liquid" is a device provided with a liquid discharge head or a liquid discharging unit, and the liquid discharge head is driven to discharge a liquid. In the case of a device for discharging liquid, the device is not only that which can discharge a liquid to an article to which liquids can be attached, but also includes the device for discharging a liquid into a gas or a liquid.

The "device for discharging liquid" can include a means relating to the feeding, conveying, and ejecting an article to which liquids can be attached, and moreover, can include a pre-processing device, a post-processing device and the like.

For example, the "device for discharging liquid" may be an image forming device that discharges ink to form an image on a sheet, and may be a stereoscopic modeling device (three-dimensional modeling device) that discharges a modeling liquid onto a powder layer formed in powder layer in order to produce a stereoscopic modeled object (three-dimensional model).

Further, the "device for discharging liquid" is not limited to a device that discharges droplets for visualizing meaningful images such as letters and figures. For example, the "device for discharging liquid" may be a device that forms a pattern and the like that is not significant by itself, and may also be a device that produces a three-dimensional model.

The above-mentioned "articles to which liquids can be attached" means an article to which liquids can be attached at least temporarily, an article to which liquids can be attached and is secured to, and an article to which liquids can be attached and permeate. As a specific example, recording media such as copy sheets, record paper, films and cloth, electronic parts such as electronic substrates and piezoelectric elements, and other media such as powder layer (powder layer), organ models and cells for inspection, and unless otherwise specified, the sheet may include any article to which a liquid attaches.

The material of the aforementioned "articles to which liquids can be attached" may be anything so long as liquids can be attached at least temporarily, such as paper, yarn, fiber, fabric, leather, metals, plastics, glass, wood, and ceramics.

Further, the "liquid" is not specifically limited as long as it has a viscosity and a surface tension capable of being discharged from the head, but the liquid may preferable have a viscosity of 30 mPa·s or less under a normal temperature and pressure or under heating or cooling. More specifically, specific examples of the liquid include a solution, a suspension, or an emulsion including a solvent, such as water or an organic solvent, a colorant such as dye or pigment, a polymerizable compound, a resin, a functional material such as a surfactant, a biocompatible material, such as DNA, amino acid, protein, or calcium, and an edible material such as a natural colorant, and these can be used for, for example, inkjet ink, surface treatment solution, a liquid for forming components of electronic elements or light-emitting elements or a resist patterns of electronic circuits, or a material solution for three-dimensional fabrication.

Further, the "device for discharging liquid" has a device so that the liquid discharge head moves relative to the articles to which liquids can be attached, but is not limited thereto. Specific examples include a serial type device which moves the liquid discharge head, a line device which does not move the liquid discharge head and the like.

Further, the "device for discharging liquid" may be a processing liquid applying device that discharges a processing liquid onto the sheet surface in order to apply a processing liquid onto the sheet surface for a purpose such as the improvement of the quality of the sheet surface, or a spray granulation device that sprays a composition liquid having raw materials dispersed inside of the liquid through a nozzle to granulate the raw material particles.

Further, among the terms of the present disclosure, terms such as image forming, recording, letter printing, photo printing, printing, and modeling are considered to be synonyms.

EXAMPLES

Below, the specific examples of the present disclosure will be described, but the present disclosure is not limited to the following examples.

(Preparation Example of Silica Particle Dispersion)

The following (1) to (4) commercially available silica sols were prepared as the silica particles, and the silica particle dispersions were prepared as follows (solid content ratio of 50% by mass in each dispersion).

When the dispersion medium of the silica was water, the solvent was substituted to ethanol, and then the solvent was substituted to acryloylmorpholine.

When the dispersion medium was ethyl methyl ketone, ethyl methyl ketone was removed by substituting the solvent with acryloylmorpholine. Namely, after adding a low volatility acryloylmorpholine to the silica dispersion liquid, it was removed using an evaporator.

Silica Sol (1) MEK-ST-40 (manufactured by Nissan Chemical Corporation) (average primary particle diameter of the silica particle: 10 nm to 15 nm, [BET method])

(2) MEK-ST-L (manufactured by Nissan Chemical Corporation) (average primary particle diameter of the silica particle: 40 nm to 50 nm, [BET method])

(3) MEK-ST-ZL (manufactured by Nissan Chemical Corporation) (average primary particle diameter of the silica particle: 70 nm to 100 nm, [BET method])

(4) MEK-ST-2040 (manufactured by Nissan Chemical Corporation) (average primary particle diameter of the silica particle: 200 nm, [centrifugal sedimentation method])

The average primary particle diameter of the above-mentioned silica particle was measured by a scanning electron microscope.

Examples 1 to 5 and Comparative Examples 1 to 7

Production of Curable Composition

The compositions were prepared by a conventional method in accordance with the formulations (% by mass relative to the entirety of the curable composition) shown in Tables 1 to 3.

Next, the obtained silica particle dispersions (solid content ratio of 50% by mass in each dispersion) were added to the above-mentioned compositions so as to make the solid contents shown in Tables 1 to 3, and the curable compositions of Examples 1 to 5 and Comparative examples 1 to 7 were prepared.

<Preparation of Cured Product>

The curable compositions of Examples 1 to 5 and Comparative examples 1 and 3 to 6 were discharged onto a polycarbonate substrate (Iupilon 100FE2000 Masking manufactured by Mitsubishi Engineering-Plastics Corporation, thickness 100 μm) using a liquid discharge head having the circulation mechanism shown in FIG. 4 to FIG. 12, and the device for discharging liquid of FIG. 13 having a micro drive mechanism so that the average thickness was 10 μm.

The curable compositions of Comparative examples 2 and 7 were discharged onto a polycarbonate substrate (Iupilon 100FE2000 Masking manufactured by Mitsubishi Engineering-Plastics Corporation, thickness 100 μm) using a device for discharging liquid equipped with a GEN4 head (manufactured by Ricoh Printing Systems Co., Ltd.) so that the average thickness was 10 μm.

Note that, immediately after discharging, ultraviolet rays were irradiated at a light amount of 1,500 mJ/cm$^2$ by an UV Irradiator LH6 manufactured by Fusion Systems Japan Co., Ltd., and each cured product was obtained.

Next, the properties of each of the obtained cured products were evaluated as follows. The results are shown in Tables 1 to 3.

<Substrate Adhesion>

The evaluation was performed using a polycarbonate substrate (Iupilon 100FE2000 Masking manufactured by Mitsubishi Engineering-Plastics Corporation, thickness 100 μm) as the substrate. The adhesion test was performed to the obtained solid coating film for evaluation by the cross-cut method shown in JIS (Japanese Industrial Standards) K-5600-5-6, and the substrate adhesion was evaluated by the following criteria. Note that, it was deemed that an evaluation of A or more was acceptable.

[Evaluation Criteria]

A: No peeling of the square, or only a small peeling at the intersection of cuts B: Peeling at one or more parts of the square C: Tape peeling could be peeled without being cross cut <Pencil Hardness Test>

The pencil hardness test was performed in accordance with JIS K5600-5-4 Scratch Hardness (Pencil Method). A scratch pencil hardness TQC WW Tester (designated load 750 g) manufactured by COTEC was used as the testing device. The pencil was mounted so as to be pressed at an angle of 45° and a load of 750 g against the coated surface. The test was conducted at a speed of 0.5 mm/s to 1 mm/s.

<Intermittent Discharge Property>

After observing the flying state of the droplets from the liquid discharge head with a high speed camera (JetScope 100L manufactured by Microjet Corporation), and continuously discharging at a discharge frequency of 20 kHz for one minute, the device was held in a waiting state without discharge for one minute, the discharge state was observed when discharging was resumed, and the intermittent discharge property was evaluated by the following criteria.

[Evaluation Criteria]

A: No discharge failure

B: Discharge failure in 1 ch to 4 ch

C: Discharge failure in 5 ch

TABLE 1

| | | Example | | | | |
|---|---|---|---|---|---|---|
| | | 1 | 2 | 3 | 4 | 5 |
| Monofunctional monomer | Acryloylmorpholine | 40 | 30 | 25 | 45 | 30 |
| | Benzyl acrylate | 28 | 20 | 20 | 10 | 5 |
| | Isobornyl acrylate | — | 13 | 8 | — | 28 |
| Multifunctional monomer | 1,9-nonanediol diacrylate | 25 | — | 40 | 33 | — |
| | Polypropylene glycol diacrylate | — | 30 | — | — | 30 |
| | Bifunctional urethane acrylate (MW: 3000) | — | — | — | 5 | — |
| Photopolymerization initiator | 2-dimethylamino-2-(4-methylbenzyl)-1-(4-morpholin-4-yl-phenyl)butane-1-one | 7 | 7 | 7 | 7 | 7 |
| Content relative to total amount of polymerizable compound of multifunctional compound (% by mass) | | 26.9 | 32.2 | 43 | 40.9 | 32.2 |
| Total (% by mass) | | 100 | 100 | 100 | 100 | 100 |
| Silica dispersion | Type of silica sol | (2) | (3) | (2) | (2) | (3) |
| | Solid content of silica relative to total amount of cured composition (% by mass) | 15 | 20 | 10 | 10 | 13 |
| Discharge conditions | Discharge by head with attached circulation mechanism | Yes | Yes | Yes | Yes | Yes |
| Evaluation results | Substrate adhesion | A | A | A | A | A |
| | Pencil hardness | H | 2H | 3H | 2H | 2H |
| | Intermittent discharge property | A | A | A | A | A |

TABLE 2

| | | Comparative example | | | |
|---|---|---|---|---|---|
| | | 1 | 2 | 3 | 4 |
| Monofunctional monomer | Acryloylmorpholine | 35 | 13 | 20 | 32 |
| | Benzyl acrylate | 36 | 25 | 25 | 20 |
| | Isobornyl acrylate | — | 3 | 13 | 8 |

TABLE 2-continued

|  |  | Comparative example | | | |
|---|---|---|---|---|---|
|  |  | 1 | 2 | 3 | 4 |
| Multifunctional compound | 1,9-nonanediol diacrylate | 2 | 50 | 30 | 30 |
|  | Polypropylene glycol diacrylate | — | — | — | — |
|  | Bifunctional urethane acrylate (MW: 3000) | 20 | 2 | 5 | 3 |
| Photopolymerization initiator | 2-dimethylamino-2-(4-methylbenzyl)-1-(4-morpholin-4-yl-phenyl)butane-1-one | 7 | 7 | 7 | 7 |
| Content relative to total amount of polymerizable compound of multifunctional compound (% by mass) |  | 23.7 | 55.9 | 37.6 | 35.5 |
| Total (% by mass) |  | 100 | 100 | 100 | 100 |
| Silica dispersion | Type of silica sol | (1) | (2) | (4) | (4) |
|  | Solid content of silica relative to total amount of cured composition (% by mass) | 15 | 10 | 10 | 10 |
| Discharge conditions | Discharge by head with attached circulation mechanism | Yes | No | Yes | Yes |
| Evaluation results | Substrate adhesion | A | B | A | A |
|  | Pencil hardness | 2B | 3H | 2H | 2H |
|  | Intermittent discharge property | C | C | C | B |

TABLE 3

|  |  | Comparative example | | |
|---|---|---|---|---|
|  |  | 5 | 6 | 7 |
| Monofunctional monomer | Acryloylmorpholine | 46 | 20 | 30 |
|  | Benzyl acrylate | — | 36 | 33 |
|  | Isobornyl acrylate | — | — | — |
| Multifunctional compound | 1,9-nonanediol diacrylate | 46 | — | 27 |
|  | Polypropylene glycol diacrylate | — | 37 | — |
|  | Bifunctional urethane acrylate (MW: 3000) | 1 | — | 3 |
| Photopolymerization initiator | 2-dimethylamino-2-(4-methylbenzyl)-1-(4-morpholin-4-yl-phenyl)butane-1-one | 7 | 7 | 7 |
| Content relative to total amount of polymerizable compound of multifunctional compound (% by mass) |  | 50.5 | 39.8 | 32.3 |
| Total (% by mass) |  | 100 | 100 | 100 |
| Silica dispersion | Type of silica sol | — | (1) | (2) |
|  | Solid content of silica relative to total amount of cured composition (% by mass) | 0 | 10 | 10 |
| Discharge conditions | Discharge by head with attached circulation mechanism | Yes | Yes | No |
| Evaluation results | Substrate adhesion | C | B | A |
|  | Pencil hardness | 3H | 2H | 2H |
|  | Intermittent discharge property | A | A | C |

From the results of Tables 1 to 3, according to the comparison between Examples 1 to 5 and Comparative examples 1, 3 and 4, it is understood that the intermittent discharge property and the substrate adhesion improve by comprising a bifunctional or higher multifunctional compound accounting for 25% by mass to 45% by mass of the entire amount of the polymerizable compounds, and a particle having an average primary particle diameter of 20 nm to 100 nm.

From the comparison between Examples 1 to 5 and Comparative example 6, it is understood that the smaller the particle diameter of the micro-particle, the worse the substrate adhesion tends to become.

Further, according to the comparison between Examples 1 to 5 and Comparative example 1, it is understood that the pencil hardness can be kept high by the content of a bifunctional or higher multifunctional compound being 25% by mass or more relative to the entire amount of the polymerizable compound.

Further, according to the comparison between Examples 1 to 5 and Comparative examples 2 and 7, it is understood that the intermittent discharge property is good by comprising a particle having an average primary particle diameter of 20 nm to 100 nm, and discharging with a head with an attached circulation mechanism.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

The invention claimed is:

1. A device for discharging liquid, the device comprising:
   a liquid discharge head comprising:
      a curable composition comprising:
         polymerizable compounds comprising a bifunctional or higher multifunctional compound accounting for 25% by mass to 45% by mass of an entire amount of the polymerizable compounds; and
         5% by mass to 30% by mass of a particle having an average primary particle diameter of 20 nm to 100 nm;
      individual liquid chambers having circulation channels in which the curable composition circulates; and
      a nozzle communicated with the individual liquid chambers, configured to discharge droplets.

2. The device of claim 1, wherein the particle comprises a silica particle.

3. The device of claim 1, wherein the liquid discharge head further comprises:
   a pressure sensor configured to detect a pressure of the curable composition; and
   a circulation rate controller configured to control a circulation rate of the curable composition to adjust the pressure of the curable composition to a target pressure.

4. The device of claim 3, wherein the circulation rate controller increases the circulation rate when a detection value of the pressure sensor is lower than the target pressure.

5. The device of claim 1, wherein the curable composition comprises 10% by mass to 20% by mass of the particle.

6. The device of claim 1, which is an inkjet discharging device.

7. A method for discharging liquid, the method comprising:

discharging a curable composition from a nozzle of a liquid discharge head while circulating the curable composition in individual liquid chambers, wherein the curable composition comprises:

polymerizable compounds comprising a bifunctional or higher multifunctional compound accounting for 25% by mass to 45% by mass of an entire amount of the polymerizable compounds; and 5% by mass to 30% by mass of a particle having an average primary particle diameter of 20 nm to 100 nm.

8. The method of claim 7, wherein the curable composition comprises 10% by mass to 20% by mass of the particle.

9. The method of claim 7, wherein the particle comprises a silica particle.

10. The method of claim 7, wherein the liquid is an inkjet ink.

11. A curable composition comprising:

polymerizable compounds comprising a bifunctional or higher multifunctional compound accounting for 25% by mass to 45% by mass of an entire amount of the polymerizable compounds; and 5% by mass to 30% by mass of a particle having an average primary particle diameter of 20 nm to 100 nm.

12. The curable composition according to of claim 11, wherein the particle comprises a silica particle.

13. The curable composition of claim 11, which comprises 10% by mass to 20% by mass of the particle.

14. The curable composition of claim 11, which is an inkjet ink.

15. A curable ink comprising the curable composition of claim 11.

16. A storing container comprising:

a container; and the curable ink of claim 15 stored in the container.

17. A cured product comprising the curable composition of claim 11.

* * * * *